(12) United States Patent
Bao et al.

(10) Patent No.: US 12,479,952 B2
(45) Date of Patent: Nov. 25, 2025

(54) HIGH-ENERGY DENSITY SHAPE MEMORY POLYMERS USING STRAIN-INDUCED SUPRAMOLECULAR NANOSTRUCTURES

(71) Applicant: The Board of Trustees of the Leland Stanford Junior University, Stanford, CA (US)

(72) Inventors: Zhenan Bao, Stanford, CA (US); Chris Cooper, Palo Alto, CA (US); Shayla Nikzad, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 359 days.

(21) Appl. No.: 17/880,559

(22) Filed: Aug. 3, 2022

(65) Prior Publication Data

US 2023/0065894 A1    Mar. 2, 2023

Related U.S. Application Data

(60) Provisional application No. 63/229,299, filed on Aug. 4, 2021.

(51) Int. Cl.
 *C08G 18/50* (2006.01)
 *C08G 18/76* (2006.01)
(52) U.S. Cl.
 CPC ..... *C08G 18/7671* (2013.01); *C08G 18/5039* (2013.01)
(58) Field of Classification Search
 CPC .............. C08G 18/5039; C08G 18/7671
 See application file for complete search history.

(56) References Cited

U.S. PATENT DOCUMENTS

| | | | | |
|---|---|---|---|---|
| 10,683,400 | B1* | 6/2020 | Rodriguez | .......... C08G 18/0804 |
| 2016/0279868 | A1* | 9/2016 | Burdick | ................ B33Y 70/00 |
| 2017/0008999 | A1* | 1/2017 | Odriozola | .......... C08G 18/3243 |
| 2017/0174842 | A1* | 6/2017 | Wang | .................. A61L 24/0031 |
| 2018/0231486 | A1* | 8/2018 | Haick | .................. G01N 27/127 |
| 2022/0372293 | A1* | 11/2022 | Rajagopalan | ........ C08G 77/458 |

FOREIGN PATENT DOCUMENTS

| | | | | |
|---|---|---|---|---|
| CN | 108559045 A | * | 9/2018 | |
| CN | 109666163 A | * | 4/2019 | ............. C08C 19/20 |
| WO | WO-2018045866 A1 | * | 3/2018 | ............. C08G 77/46 |

OTHER PUBLICATIONS

CN-109666163-A_Apr. 3, 2019_English Translation.*
CN-108559045-A_Sep. 21, 2018_English Translation.*

* cited by examiner

*Primary Examiner* — Michael L Leonard
(74) *Attorney, Agent, or Firm* — Foley & Lardner LLP

(57) ABSTRACT

Periodic placement of directional dynamic bonding units along a flexible polymer backbone enables the formation of large supramolecular structures during strain. These structures, which form due to the alignment of stretched backbone chains, lock the stretched chains in their elongated state due to the formation of the directional dynamic bonds. Application of an appropriate stimulus (i.e., heat or light) weakens the dynamic bonds and enables the elongated chains to retract, performing measurable work and enabling the use of these structures as polymer actuators. Importantly, the high strength of the dynamic bonds enables a large amount of entropic energy to be stored in the elongated chains, enabling the polymer to achieve a large actuation force during recovery.

18 Claims, 33 Drawing Sheets

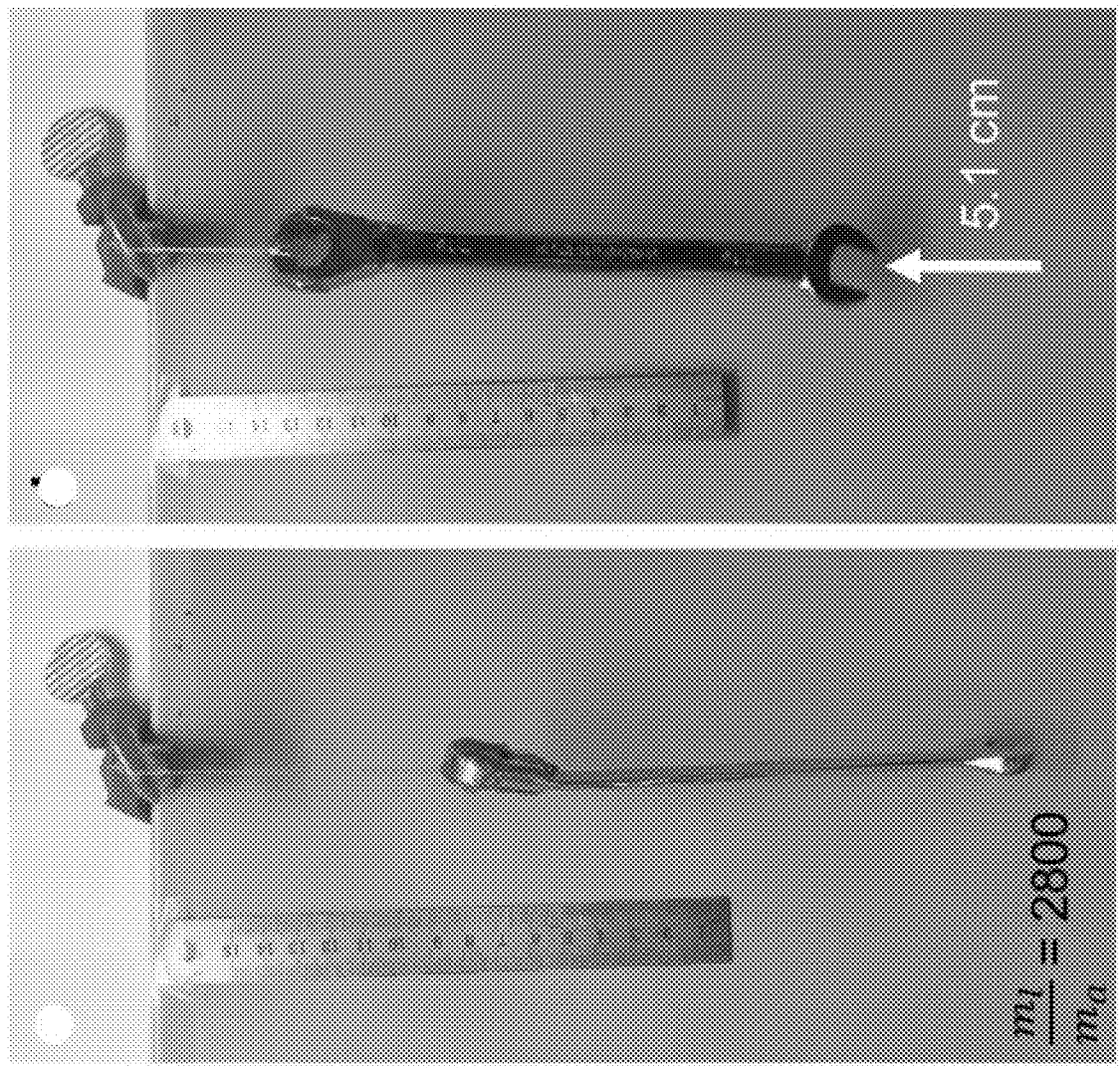

HIGH-ENERGY DENSITY SHAPE MEMORY POLYMERS USING STRAIN-INDUCED SUPRAMOLECULAR NANOSTRUCTURES

CROSS-REFERENCE TO RELATED APPLICATIONS

The present application is based on, and claims priority to U.S. Provisional Patent Application No. 63/229,299 filed Aug. 4, 2021, the contents of which is incorporated herein by reference in its entirety.

TECHNICAL FIELD

The present embodiments relate generally to soft actuators, soft robotics, artificial muscle, virtual reality motion generation, responsive surfaces, stretchable and wearable electronics and more particularly to a high energy density shape memory polymer based on the formation of strain-induced supramolecular nanostructures, which immobilize stretched chains to store entropic energy.

BACKGROUND

Shape memory polymers are promising materials in many emerging applications due to their large extensibility and excellent shape recovery. However, practical application of these polymers is limited by their poor energy densities (up to ~1 MJ/m$^3$). For example, current polymer actuators can only generate low actuation forces.

It is against this technological backdrop that the present Applicant sought a technological solution to these and other issues rooted in this technology.

SUMMARY

The present embodiments are directed to an approach to achieve a high energy density, one-way shape memory polymer based on the formation of strain-induced supramolecular nanostructures. As polymer chains align during strain, strong directional dynamic bonds form, creating stable supramolecular nanostructures and trapping stretched chains in a highly elongated state. Upon heating, the dynamic bonds break and stretched chains contract to their initial disordered state. This mechanism stores large amounts of entropic energy (as high as 19.6 MJ/m$^3$ or 17.9 J/g), almost six times higher than the best previously reported shape memory polymers while maintaining near 100% shape recovery and fixity. The reported phenomenon of strain-induced supramolecular structures offers a new approach toward achieving high energy density shape memory polymers. For example, by utilizing the formation of many dynamic bonds that occurs during strain-induced supramolecular structure formation, the actuation force generated by the polymer network can be increased without sacrificing stretchability or reversibility.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 1A illustrates how combining a flexible backbone polymer (polypropylene glycol, PPG) with a strong and directional hydrogen-bonding unit (methylene bisphenylurea, MPU) creates a tough and stretchable polymer with high network junction density.

FIG. 1B shows that when the polymer is stretched from its initial amorphous state, the alignment of the polymer chains induces the formation of supramolecular structures from the directional hydrogen bond as shown by the insets. The creation of these structures stabilizes the chains in a temporary state. Upon heating, the supramolecular structures disassemble and the film rapidly contracts to its initial state.

FIG. 2A provides Images of PPG-MPU in its initial state, stretched over 300% to a temporary state and then heated to its recovered state (from top to bottom). The scale bar is 1 cm for all images.

FIG. 2B is a graph providing an example Pristine stress-strain curve of PPG-MPU at a strain rate of 200% per minute. The shaded area under the curve shows the materials high toughness of 270 MPa.

FIG. 2C are images illustrating an example of when strained above 300%, PPG-MPU transitions from transparent to opaque white, characteristic of the formation of large domains. The scale bar is 1 cm for both left and right images. When strained to failure, PPG-MPU fractures into multiple tendrils (right).

FIG. 2D is a graph illustrating a Representative recovery stress versus temperature for PPG-MPU at 300% strain.

FIG. 2E is a graph illustrating a Representative free strain recovery experiment on PPG-MPU from 300% strain.

FIG. 2F is a plot providing a Literature comparison of the estimated energy density (y-axis) and the product of shape fixity and recovery (x-axis) plotted for different SMPs (see Table S1).

FIGS. 3A and 3B are 2D SAXS images of PPG-MPU at 0% and 500% strain, respectively. Insets show the morphological change from initially amorphous to aligned supramolecular structures based on the change in scattering profiles.

FIG. 3C provides 1D SAXS intensity curves parallel to the direction of strain (integrated over 9°) at 0% (black), 100% (purple), 200% (blue), 300% (green), 400% (yellow), and 500% (orange) strain. Inset plots Herman's orientation parameter as a function of strain.

FIGS. 3D and 3E provide Height AFM images of PPG-MPU at 0% and 300% strain respectively.

FIG. 3F provides an example 2D-FFT of the height AFM image in FIG. 3E.

FIG. 3G provides 2D WAXS images of PPG-MPU unstrained (top) and strained (bottom).

FIG. 3H provides 1D WAXS scattering profiles of strained PPG-MPU parallel (black) and perpendicular (blue) to strain.

FIG. 3I illustrates an example Ratio of absorbance of urea N—H stretch (~3350 cm$^{-1}$) to the PPG backbone C—O stretch (~1100 cm$^{-1}$) as a function of polarizer angle for unstrained (black) and strained (blue) samples of PPG-MPU. For all parts, blue arrows indicate the stretching direction.

FIG. 4A is an example Schematic of hierarchical assembly. From left to right: i) A bulk film of PPG-MPU is strained. ii) Long, fibril shaped regions >10 μm in length (green) and ~100 nm in width (orange) emerge parallel to strain. iii) These long fibrils are comprised of stacked layers of nanofibers oriented perpendicular to strain that are ~8 nm in diameter (purple) and separated by amorphous connecting regions. Each nanofiber is composed of multiple aligned nanorods. iv) Nanorods are formed from stacked urea-urea hydrogen bonds (4.5 Å, yellow) between MPU units on the chain. The formation of these strain-induced supramolecular nanostructures traps stretched PPG backbone chains (~2 nm, red) in an elongated state, resulting in desirable shape memory behavior.

FIG. 4B provides example Polarized optical microscope images of a stretched PPG-MPU film. The orientation of the cross polarizer is shown in the top left.

FIG. 4C provides an example Height AFM image of PPG-MPU at 500% strain. Dashed white box indicates zoomed region.

FIG. 4D provides an example Zoomed height AFM image shown in 3D (top). Height profile along center of the fibril showing periodic fiber cross-sections (bottom). For all parts, white arrows indicate the stretching direction.

FIGS. 5A to 5G provide an example demonstration of PPG-MPU as a high energy density actuator according to embodiments:

FIGS. 5A and 5B illustrate how an example pre-strained film of PPG-MPU (1 mg) lifts a quarter (5.6 g, 5000 times the polymer's weight) by 3.6 cm upon heating, corresponding to a work output of 2 J/g.

FIGS. 5C and 5D illustrate how an example pre-strained film of PPG-MPU (25 mg) lifts a 70 g weight (2800 times the polymer's weight) by 5.1 cm upon heating, corresponding to a work output of 1.4 J/g.

FIGS. 5E and 5F illustrate how an artificial muscle comprised of pre-strained films of PPG-MPU (3.8 g) actuates a full-size mannequin arm (0.6 kg) upon heating. For scale, the total length of the arm is 0.75 m and the forearm (elbow to end of hand) is 0.45 m.

FIG. 5G provides an example comparison of PPG-MPU (yellow stars) to other polymer-based actuators (grey triangles) based on mass of the load lifted divided by the mass of the actuator (y-axis) versus the achieved displacement of the load (x-axis). The dashed lines represent constant specific work density, increasing from 10-4 J/g (dark blue, bottom left) to 10 J/g (green, top right).

FIG. 7A is an example Multiple pristine stress strain curves for multiple runs. The curves give averages for tensile strength (70±6 MPa), modulus (1.2±0.3 GPa), extensibility (500±200%), and toughness (270±100 MPa) with sample size n=4.

FIG. 7B illustrates Multiple recovery stress experiments after deformation to 300% strain. The curves give an average recovery stress of 13.1±0.4 MPa, with the peak occurring at an average temperature of 51±4° C. with sample size n=3.

FIG. 7C illustrates Multiple free strain recovery stress experiments after deformation to 300% strain. The curves give an average fixed strain of 280±20% or a shape fixity of 0.93±0.05 as well as an average recoverable strain of 296±2% or a shape recovery of 0.99±0.01 with sample size n=3.

FIG. 8A illustrates results for when PPG-MPU is repeatedly stretched to 300% strain, and then heated (by heat gun) to return to its initial length (stress-free recovery) for five cycles. Residual strain on the first cycle is below 6% and below 8% at the last cycle. All strains are relative to the pristine initial sample length.

FIG. 8B provide Stress-strain curves during stretching for each cycle.

FIG. 9A provides example 1D WAXS scattering profiles from unstrained PPG-MPU in parallel and perpendicular directions. Polarized FTIR spectra of unstrained (FIG. 9B) and uniaxially strained (FIG. 9C) PPG-MPU for a range of polarizer angles, with 0 degrees coinciding with the straining direction.

FIG. 11A illustrate an example 2 μm AFM height image from PPG-MPU at 300% strain, extracted height profiles marked by white lines.

FIG. 11B is a graph showing example Cumulative distribution functions (CDFs) for fiber diameter and fiber height extracted from the image in FIG. 11A. The fiber diameter CDF was obtained by first finding all peaks in the above height profiles and extracting the width of each peak ("Find peaks" in gwyddion software). All profiles were combined into one distribution and plotted as the fiber diameter CDF (yellow). The fiber height CDF (blue) was obtained directly from the cumulative height distribution in Gwyddion's statistical functions package. The similarity between the two distributions (both with a median between 8-9 nm) is expected since they both approximate the fiber diameter in-plane and out-of-plane.

FIG. 12A provides example 1D SAXS data (dark blue circles) measured parallel to the direction of strain (integrated over 9°) for PPG-MPU film at 500% strain. Data is fit (light blue curve) to determine the surface fractal dimension by, $I=Aq^{(-(6-D))}+B$, where $A=1.43*10-4$, $B=0.495$, and $D=2.35$. From the fitting parameters, one can calculate an onset point of 0.107 Å-1 (where $Aq^{(-n)}=B$). The end of power law behavior at 0.107 Å-1 (5.9 nm) corresponds to the building block of the fractal surface and is consistent with the estimated nanofiber diameter. Fitting was done in Python.

FIG. 12B illustrates analysis of the AFM image in FIG. 3E (main text) for surface fractal behavior via the 'cube counting' method in Gwyddion. The algorithm imposes a cubic lattice of length 1 onto the z-expanded (i.e., 3D) surface measured by AFM. N(l) measures the number of cubes needed to fully cover the surface. A plot of log N vs. log h (open squares), where h is the reciprocal lattice h=1/l, directly yields the fractal dimension through linear regression (red line). The measured fractal dimension is D=2.3.

FIG. 14A illustrate Comparison of extended human arm and extended mannequin arm show that they are both similar in length.

FIG. 14B illustrates a Mannequin arm holding a large orange as a reference.

DETAILED DESCRIPTION

Figure 1A:
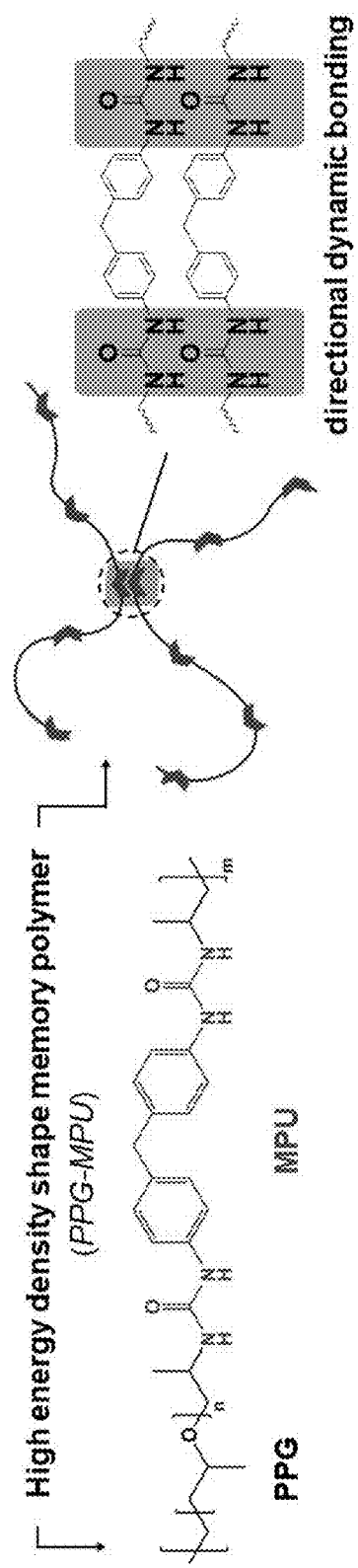
FIGS. 1A and 1B illustrates aspects of achieving high energy density in shape memory polymers using strain-induced supramolecular structures according to embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Introduction

Many emerging applications, such as soft robotics, deployable hinges or space structures, sealants, and smart biomedical sutures and devices require high energy density one-way shape memory materials capable of large-strain and hysteresis-free shape recovery. (See Lendlein, A.; Kelch, S. Shape-Memory Polymers. *Angewandte Chemie International Edition* 2002, 41 (12), 2034-2057. https://doi.org/10.1002/1521-3773(20020617)41:12<2034::AID-ANIE2034>3.0.CO;2-M; Hu, J.; Zhu, Y.; Huang, H.; Lu, J. Recent Advances in Shape-Memory Polymers: Structure, Mechanism, Functionality, Modeling and Applications. *Progress in Polymer Science* 2012, 37 (12), 1720-1763. https://doi.org/10.1016/j.progpolymsci.2012.06.001; Roth, P. J.; Lowe, A. B. Stimulus-Responsive Polymers. *Polym. Chem.* 2017, 8 (1), 10-11. https://doi.org/10.1039/C6PY90169G; Lendlein, A.; Gould, O. E. C. Reprogrammable Recovery and Actuation Behaviour of Shape-Memory Polymers. *Nature Reviews Materials* 2019, 4 (2), 116-133. https://doi.org/10.1038/s41578-018-0078-8; Xia, Y.; He, Y.; Zhang, F.; Liu, Y.; Leng, J. A Review of Shape Memory Polymers and Composites: Mechanisms, Materials, and Applications. *Advanced Materials* 2021, 33 (6), 2000713 https://doi.org/10.1002/adma.202000713.) Shape memory polymers (SMPs) are a promising choice due to their excellent shape recovery and fixity, large extensibility, low density, and ease of processing. (See (6) McCracken, J. M.; Donovan, B. R.; White, T. J. Materials as Machines. *Advanced Materials* 2020, 32 (20), 1906564. https://doi.org/10.1002/adma.201906564.) Furthermore, SMPs can be integrated with 3D or 4D printing, be patterned or programmed into complex shapes, and exhibit locally controlled actuation, which greatly enhances their potential for broader application. (See Biswas, M. C.; Chakraborty, S.; Bhattacharjee, A.; Mohammed, Z. 4D Printing of Shape Memory Materials for Textiles: Mechanism, Mathematical Modeling, and Challenges. *Advanced Functional Materials* 2021, 31 (19), 2100257 https://doi.org/10.1002/adfm.202100257; Jin, B.; Song, H.; Jiang, R.; Song, J.; Zhao, Q.; Xie, T. Programming a Crystalline Shape Memory Polymer Network with Thermo- and Photo-Reversible Bonds toward a Single-Component Soft Robot. *Science Advances* 2018, 4 (1), eaao3865. https://doi.org/10.1126/sciadv aao3865; Wang, X.; Guo, X.; Ye, J.; Zheng, N.; Kohli, P.; Choi, D.; Zhang, Y.; Xie, Z.; Zhang, Q.; Luan, H. et al. Freestanding 3D Mesostructures, Functional Devices, and Shape-Programmable Systems Based on Mechanically Induced Assembly with Shape Memory Polymers. *Advanced Materials* 2019, 31 (2), 1805615. https://doi.org/10.1002/adna.201805615.) However, SMPs ubiquitously suffer from poor energy density (<1 MJ/m$^3$), (see Anthamatten, M.; Roddecha, S.; Li, J. Energy Storage Capacity of Shape-Memory Polymers. *Macromolecules* 2013, 46 (10), 4230-4234. https://doi.org/10.1021/ma400742g) limiting their use where performing mechanical work is required.

SMPs reversibly alternate between a temporary deformed state and an initial undeformed state through application of a stimulus, such as heat or light. Stabilization (or fixing) of the temporary state requires a controllable molecular level change (e.g., glass or melting transition, (see Tian, M.; Gao, W.; Hu, J.; Xu, X.; Ning, N.; Yu, B.; Zhang, L. Multidirectional Triple-Shape-Memory Polymer by Tunable Cross-Linking and Crystallization. *ACS Appl. Mater. Interfaces* 2020, 12 (5), 6426-6435. https://doi.org/10.1021/acsami.9b19448; Lewis, C. L.; Meng, Y.; Anthamatten, M. Well-Defined Shape-Memory Networks with High Elastic Energy Capacity. *Macromolecules* 2015, 48 (14), 4918-4926 https://doi.org/10.1021/acs.macromol.5b00763; Nguyen, N. A.; Meek, K. M.; Bowland, C. C.; Barnes, S. H.; Naskar, A. K. An Acrylonitrile-Butadiene-Lignin Renewable Skin with Programmable and Switchable Electrical Conductivity for Stress/Strain-Sensing Applications. *Macromolecules* 2018, 51 (1), 115-127. https://doi.org/10.1021/acs.macromol.7b02336; Wang, W.; Ping, P.; Chen, X.; Jing, X. Polylactide-Based Polyurethane and Its Shape-Memory Behavior. *European Polymer Journal* 2006, 42 (6), 1240-1249 https://doi.org/10.1016/j.eurpolymj.2005.11.029; Lin, T.; Tang, Z.; Guo, B. New Design Strategy for Reversible Plasticity Shape Memory Polymers with Deformable Glassy Aggregates. *ACS Appl. Mater. Interfaces* 2014, 6 (23), 21060-21068. https://doi.org/10.1021/am505937p) dynamic networks, (see Jiang, L.; Liu, Z.; Lei, Y.; Yuan, Y.; Wu, B.; Lei, J. Sustainable Thermosetting Polyurea Vitrimers Based on a Catalyst-Free Process with Reprocessability, Permanent Shape Reconfiguration and Self-Healing Performance. *ACS Appl. Polym. Mater.* 2019, 1 (12), 3261-3268. https://doi.org/10.1021/acsapm.9b00672; Zhang, G.; Zhao, Q.; Zou, W.; Luo, Y.; Xie, T. Unusual Aspects of Supramolecular Networks: Plasticity to Elasticity, Ultrasoft Shape Memory, and Dynamic Mechanical Properties. *Adv. Funct. Mater.* 2016, 26 (6), 931-937. https://doi.org/10.1002/adfm.201504028; Li, J.; Viveros, J. A.; Wrue, M. H.; Anthamatten, M. Shape-Memory Effects in Polymer Networks Containing Reversibly Associating Side-Groups. *Advanced Materials* 2007, 19 (19), 2851-2855. https://doi.org/10.1002/adma.200602260; Fang, Z.; Zheng, N.; Zhao, Q.; Xie, T. Healable, Reconfigurable, Reprocessable Thermoset Shape Memory Polymer with Highly Tunable Topological Rearrangement Kinetics. *ACS Appl. Mater. Interfaces* 2017, 9 (27), 22077-22082. https://doi.org/10.1021/acsami.7b05713; Burnworth, M.; Tang, L.; Kumpfer, J. R.; Duncan, A. J.; Beyer, F. L.; Fiore, G. L.; Rowan, S. J.; Weder, C. Optically Healable Supramolecular Polymers. *Nature* 2011, 472 (7343), 334-337. https://doi.org/10.1038/nature09963; Krajovic, D. M.; Anthamatten, M. Melt-Processable Shape-Memory Elastomers Containing Bisurea Segments. *ACS Appl. Polym. Mater.* 2021, 3 (4), 2082-2087 https://doi.org/10.1021/acsapm.1c00129.) strain-induced crystallization, (see Meng, Y.; Jiang, J.; Anthamatten, M. Body Temperature Triggered Shape-Memory Polymers with High Elastic Energy Storage Capacity. *Journal of Polymer Science Part B: Polymer Physics* 2016, 54 (14), 1397-1404. https://doi.org/10.1002/polb.23990; Fritzsche, N.; Pretsch, T. Programming of Temperature-Memory Onsets in a Semicrystalline Polyurethane Elastomer. *Macromolecules* 2014, 47 (17), 5952-5959. https://doi.org/10.1021/ma501171p; Li, G.; Wang, A. Cold, Warm, and Hot Programming of Shape Memory Polymers. *Journal of Polymer Science Part B: Polymer Physics* 2016, 54 (14), 1319-1339. https://doi.org/10.1002/polb.24041; Zhang, P.; Li, G. Structural Relaxation Behavior of Strain Hardened Shape Memory Polymer Fibers for Self-Healing Applications. *Journal of Polymer Science Part B: Polymer Physics* 2013, 51 (12), 966-977. https://doi.org/10.1002/polb.23295.) or liquid crystal phase transition (see Kim, H.; Boothby, J. M.; Ramachandran, S.; Lee, C. D.; Ware, T. H. Tough, Shape-Changing Materials: Crystallized Liquid Crystal Elastomers. *Macromolecules* 2017, 50 (11), 4267-4275. https://doi.org/10.1021/acs.macromol.7b00567; Saed, M. O.; Ambulo, C. P.; Kim, H.; De, R.; Raval, V.; Searles, K.; Siddiqui, D. A.; Cue, J. M. O.; Stefan, M. C.; Shankar, M. R.; Ware, T. H. Molecularly-Engineered, 4D-Printed Liquid Crystal Elastomer Actuators. *Advanced Functional Materials* 2019, 29 (3), 1806412. https://doi.org/10.1002/adfm.201806412; Lee, K. M.; Bunning, T. J.; White, T. J. Autonomous, Hands-Free Shape Memory in Glassy, Liquid Crystalline Polymer Networks. *Advanced Materials* 2012, 24 (21), 2839-2843 https://doi.org/10.1002/adma.201200374.)) that can be selectively activated and deactivated. Upon deactivation, SMPs return to their original undeformed state, driven by the relaxation of deformed chains between network junctions (e.g., topological entanglements, chemical crosslinks, or secondary interpenetrating networks) that preserve the material's memory of its initial state via stored entropic energy. (See Xie, T. Recent Advances in Polymer Shape Memory. *Polymer* 2011, 52 (22), 4985-5000. https://doi.org/10.1016/j.polymer.2011.08.003.)

The present Applicant, among other observations, recognizes that achieving high energy density SMPs that simultaneously possess high recovery stress and large recoverable strain poses a significant challenge. In general, the recovery stress generated by a SMP as it returns to its initial state is determined by the stored entropic energy in the network, which is controlled by the density and strength of network junctions. Since junction density in an entangled network is predetermined by the entanglement molecular weight of the polymer, SMPs generally store entropic energy on the same order of magnitude as their entanglement plateau modulus (~1 MPa), providing an upper limit on the achievable recovery stress. (See Hornat, C. C.; Yang, Y.; Urban, M. W. Quantitative Predictions of Shape-Memory Effects in Polymers. *Advanced Materials* 2017, 29 (7), 1603334 https://doi.org/10.1002/adma.201603334.) A high degree of chemical cross-linking can increase junction density (and thus increase recovery stress), but significantly reduces stretchability, decreasing overall energy density. Dynamic bonds offer a potential solution because their ability to break and reform allows for chain sliding, while still increasing junction density. (See Li, C.-H.; Wang, C.; Keplinger, C.; Zuo, J.-L.; Jin, L.; Sun, Y.; Zheng, P.; Cao, Y.; Lissel, F.; Linder, C.; You, X.-Z.; Bao, Z. A Highly Stretchable Autonomous Self-Healing Elastomer. *Nature Chemistry* 2016, 8 (6), 618-624. https://doi.org/10.1038/nchem.2492; Kang, J.; Son, D.; Wang, G.-J. N.; Liu, Y.; Lopez, J.; Kim, Y.; Oh, J. Y.; Katsumata, T.; Mun, J.; Lee, Y.; Jin, L.; Tok, J. B.-H.; Bao, Z. Tough and Water-Insensitive Self-Healing Elastomer for Robust Electronic Skin. *Advanced Materials* 2018, 30 (13), 1706846. https://doi.org/10.1002/adna.201706846.) However, if the dynamic bonds are too weak, recovery stress is minimally increased. If the dynamic bonds are too strong, their behavior resembles that of a cross-linked network with low stretchability. Strain-induced crystallization in SMPs has also improved energy density, but the formation of crystallites during extension is difficult to control. While composite materials (e.g., polymer-CNT) have been reported with higher energy densities, these composites have significantly worse shape fixity and recovery (<50%) and low recoverable strain (<50%), creating hysteresis issues. (See Miaudet, P.; Derré, A.; Maugey, M.; Zakri, C.; Piccione, P. M.; Inoubli, R.; Poulin, P. Shape and Temperature Memory of Nanocomposites with Broadened Glass Transition. *Science* 2007, 318 (5854), 1294-1296 https://doi.org/10.1126/science.1145593.) To date, none of these mechanisms have produced high energy density SMPs that simultaneously possess high recovery stress and large recoverable strain.

The present Applicant addresses this challenge among others by reporting a novel shape memory mechanism based on the formation of strain-induced supramolecular structures by polymer chains with dynamic bonds. Under strain, polymer chains align into stable and hierarchically organized supramolecular nanostructures, trapping the stretched polymer chains in a highly elongated state. Accordingly, large amounts of energy are stored (19.6 MJ/m$^3$ or 17.9 J/g), six times higher than the best previously reported SMPs, while maintaining near 100% shape fixity and recovery.

Results and Discussion

Figure 6:
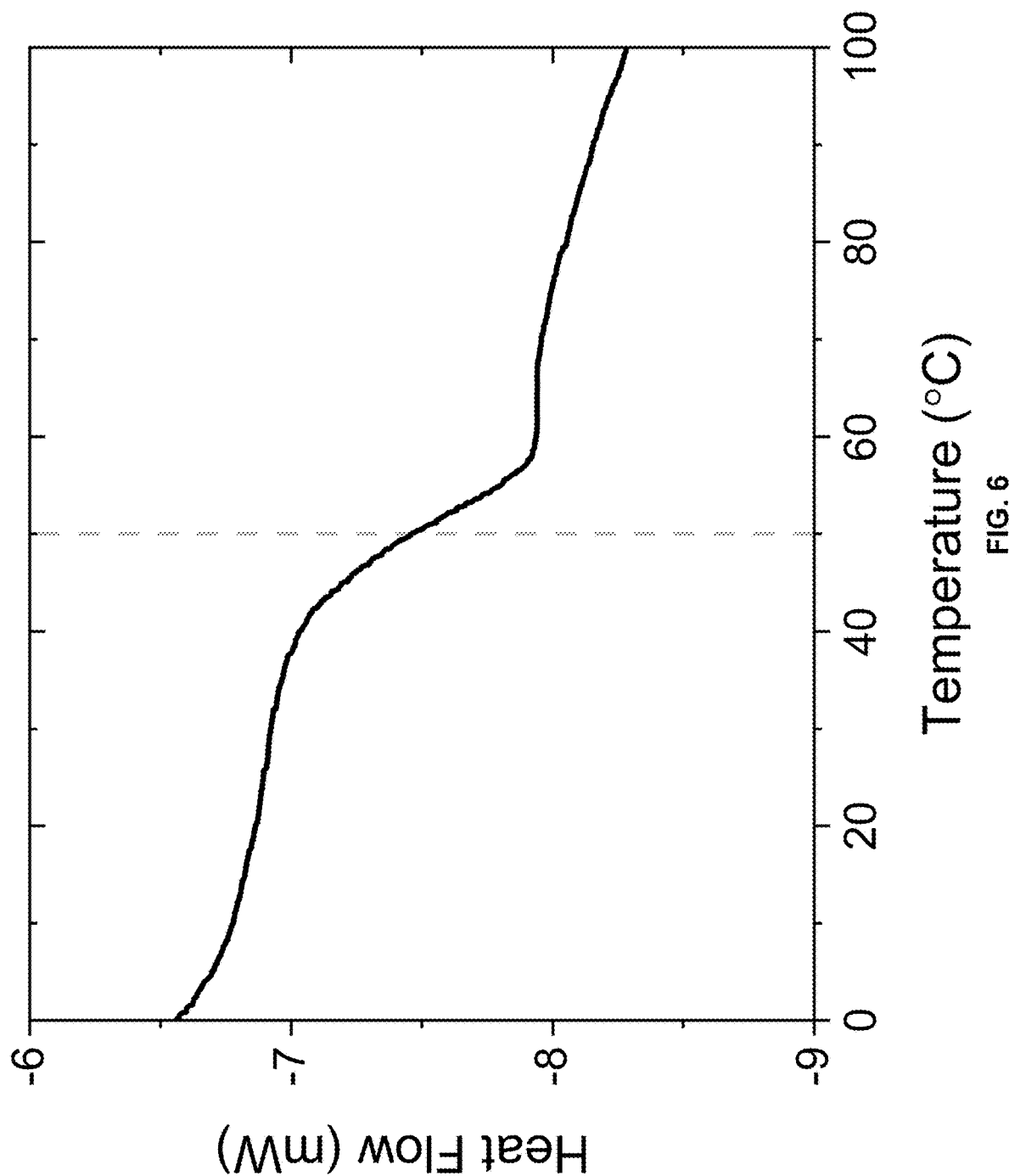
FIG. 6 is a graph illustrating an example Differential scanning calorimetry (DSC) thermal analysis of PPG-MPU. The dashed line marks a broad glass transition at 50° C.

The polymer employed here (denoted hereafter as PPG-MPU, $M_n$=10 kDa, $Đ_M$=1.1, FIG. 1A) was synthesized through a simple, one-pot synthesis of diamine-terminated poly(propylene glycol) (PPG) macromonomers (Jeffamine D400, $M_n$=0.4 kDa) and methylene(bis phenyl diisocyanate), which incorporates methylene bisphenylurea (MPU) units into the polymer backbone, similar to other systems with bisurea-based dynamic bonds. (See Colombani, O.; Barioz, C.; Bouteiller, L.; Chanéac, C.; Fompérie, L.; Lortie, F.; Montès, H. Attempt toward 1D Cross-Linked Thermoplastic Elastomers: Structure and Mechanical Properties of a New System. *Macromolecules* 2005, 38 (5), 1752-1759 https://doi.org/i0.1021/ma048006m; Appel, W. P. J.; Portale, G.; Wisse, E.; Dankers, P. Y. W.; Meijer, E. W. Aggregation of Ureido-Pyrimidinone Supramolecular Thermoplastic Elastomers into Nanofibers: A Kinetic Analysis. *Macromolecules* 2011, 44 (17), 6776-6784. https://doi.org/10.1021/ma201303s.) PPG-MPU has a high loading of these MPU hydrogen bonding units (~38 wt %) and thus a large density of strong network junctions and much higher $T_g$ of 50° C. (FIG. 6) compared to PPG (−75° C.). (See Wypych, G. PPG Polypropylene Glycol. In *Handbook of Polymers (Second Edition)*; Wypych, G., Ed.; ChemTec Publishing, 2016; pp 517-519. https://doi.org/10.1016/B978-1-895198-92-8.50160-9) Furthermore, both reagents are common components of the polyurethane industry and produced in millions of tons per year, giving PPG-MPU an estimated raw materials cost of less than $5/kg (see below), making it attractive for large-scale applications.

Figure 1B:
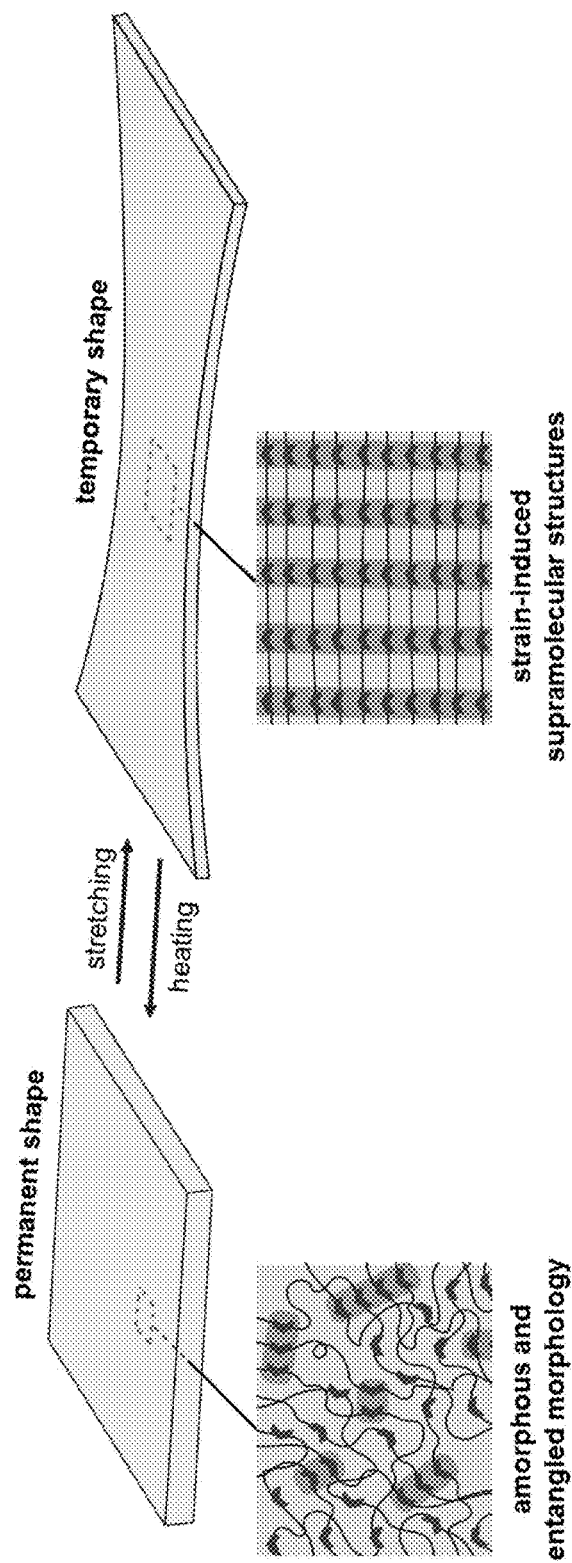

Previous work has shown that polymer chains with periodically-placed and directional dynamic bonds assemble spontaneously into supramolecular nanofibers if their overall number-averaged molecular weight ($M_n$) is below the polymer's critical molecular weight of entanglement ($M_c$). (See Cooper, C. B.; Kang, J.; Yin, Y.; Yu, Z.; Wu, H.-C.; Nikzad, S.; Ochiai, Y.; Yan, H.; Cai, W.; Bao, Z. Multivalent Assembly of Flexible Polymer Chains into Supramolecular Nanofibers. *J. Am. Chem. Soc.* 2020, 142 (39), 16814-16824. https://doi.org/10.1021/jacs.0c07651) Here, exploited is this understanding to design a high energy density SMP whose $M_n$>$M_c$ ($M_{c,\ PPG}$~5-6 kDa). (See Heinrich, G.; Alig, I.; Donth, E. A Model for the Onset of Entanglements of Transient Hydrogen-Bonded Intermolecular Structures in Oligomeric Poly(Propylene Glycol). *Polymer* 1988, 29 (7), 1198-1202 https://doi.org/10.1016/0032-3861(88)90044-4; Wool, R. P. Polymer Entanglements. *Macromolecules* 1993, 26(7), 1564-1569. https://doi.org/10.1021/ma00059a012) Initially (i.e., no strain), PPG-MPU adopts an amorphous structure without the presence of large supramolecular aggregates due to topological entanglements. When strained, polymer chains align, and the dynamic bonds reassemble into large, ordered supramolecular nanostructures (FIG. 1B). The formation of these nanostructures traps the polymer backbones in a highly stretched state, increasing the amount of stored entropic energy compared to other reported SMPs. Furthermore, a high junction density of entanglements and dynamic bonds preserves the initial state of the polymer, allowing for full recovery to its original state upon heating. Thus, these strain-induced supramolecular cooperative assemblies enable high recovery stress and energy density without sacrificing extensibility, shape recovery, or shape fixity. Throughout this paper, used are both "supramolecular" and "dynamic" to describe the non-covalent bonds formed between urea groups, as the former highlights the intermolecular (or interchain) nature of the bond formation while the latter underlines the ability of these interactions to reversibly associate and dissociate (distinct from the more specific class of dynamic covalent bonds).

Shape Memory Properties

Figure 2B:
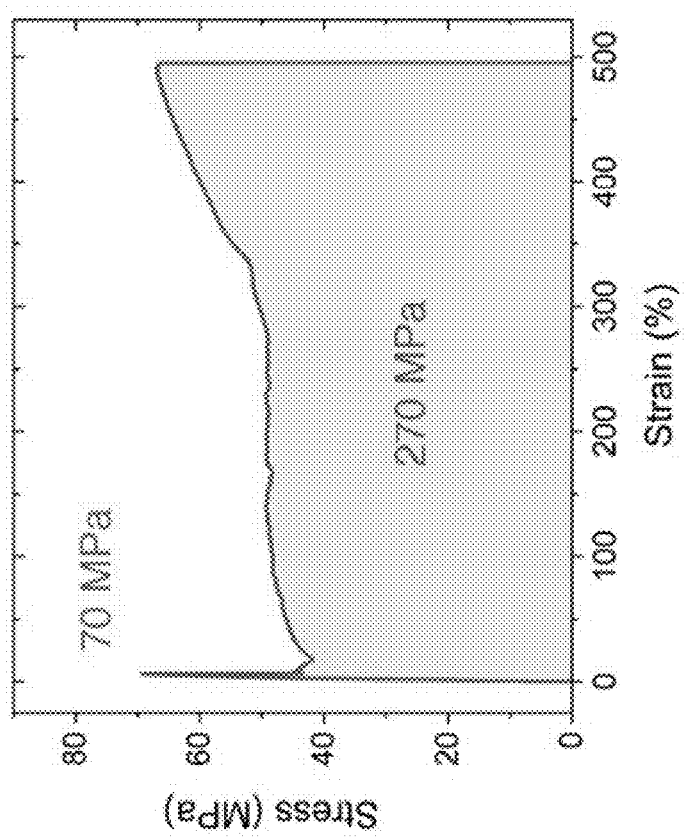
FIGS. 2A to 2F illustrate example aspects of mechanical and shape memory characterization of PPG-MPU according to embodiments.
Figure 2A:
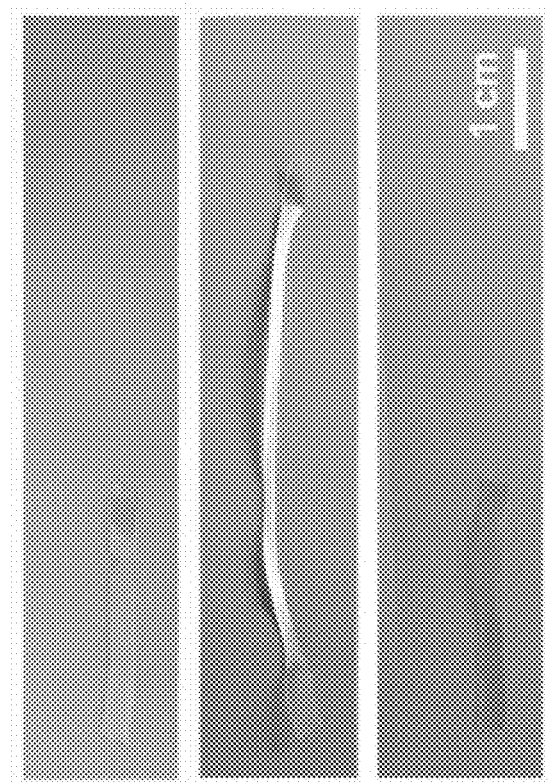
Figure 2C:
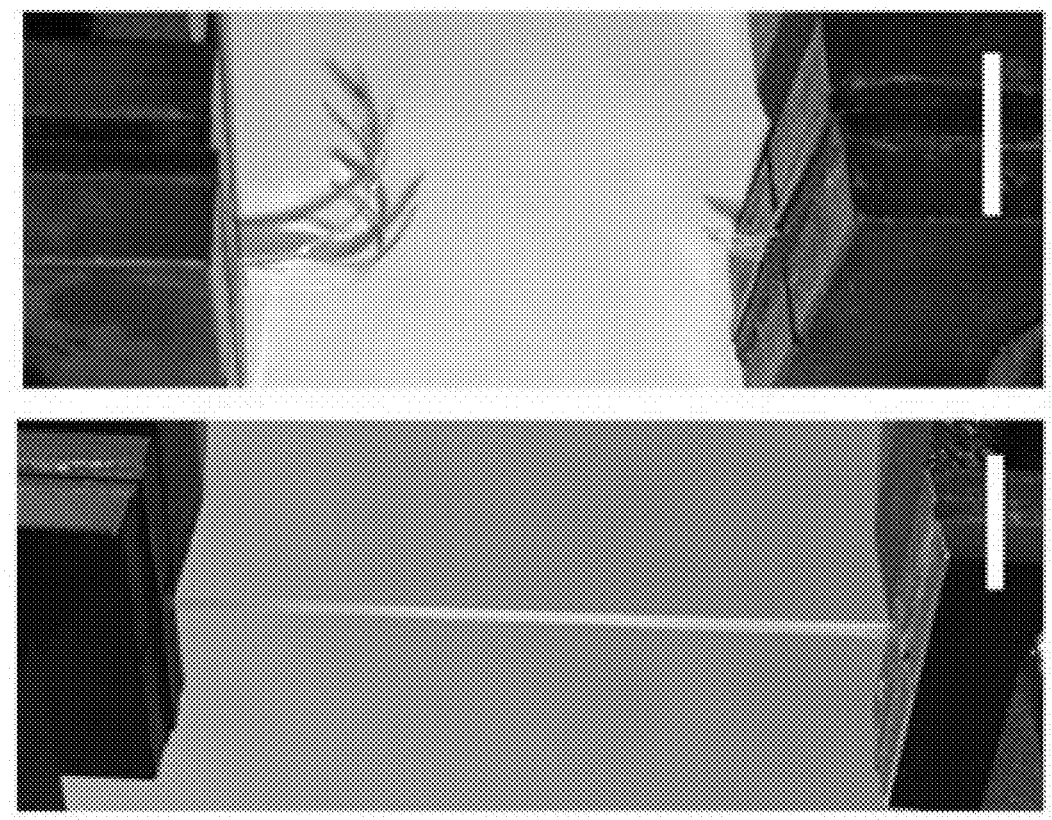
Figure 7A:
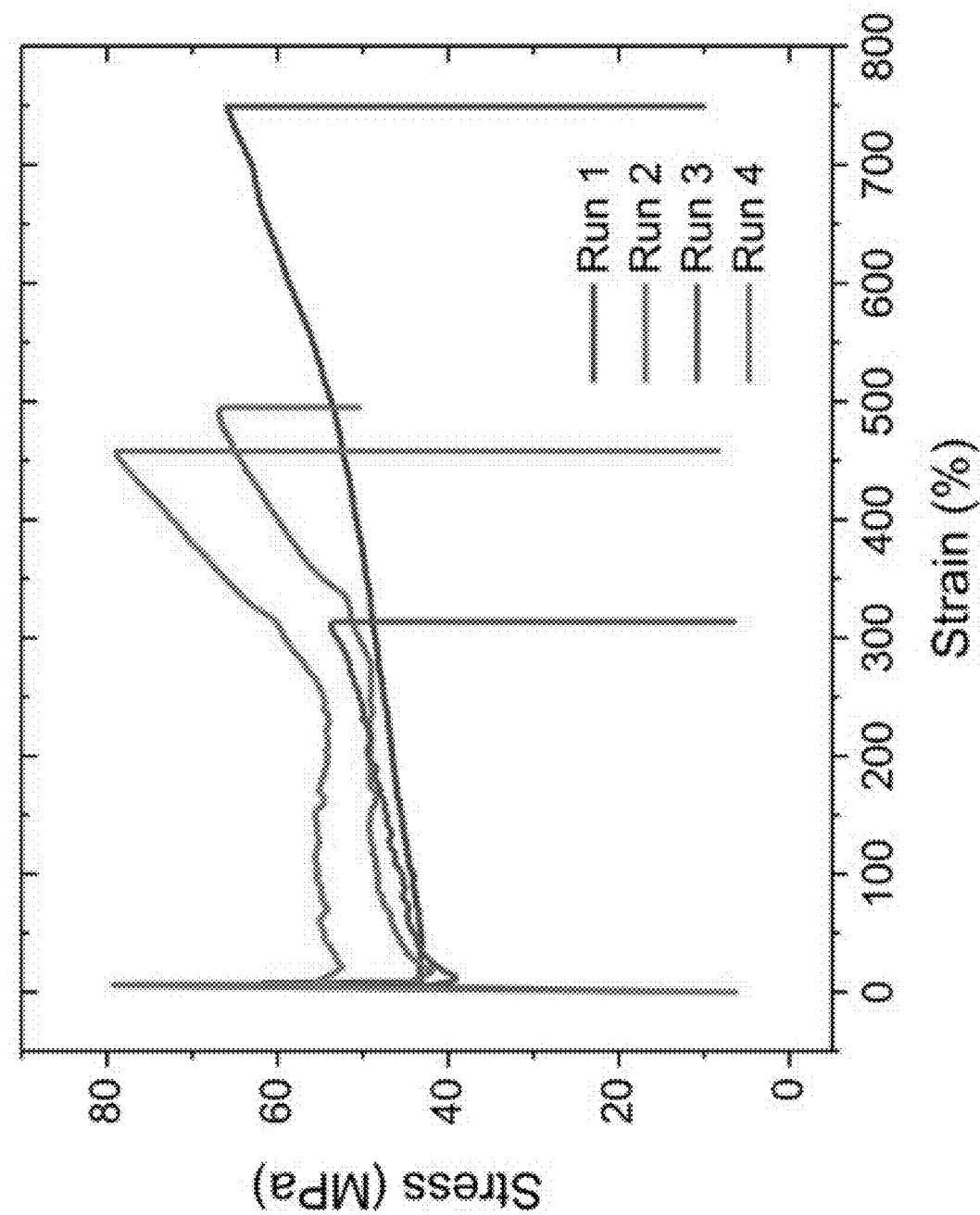
FIGS. 7A to 7C illustrate example additional mechanical tests for PPG-MPU according to embodiments.
Figure 7C:
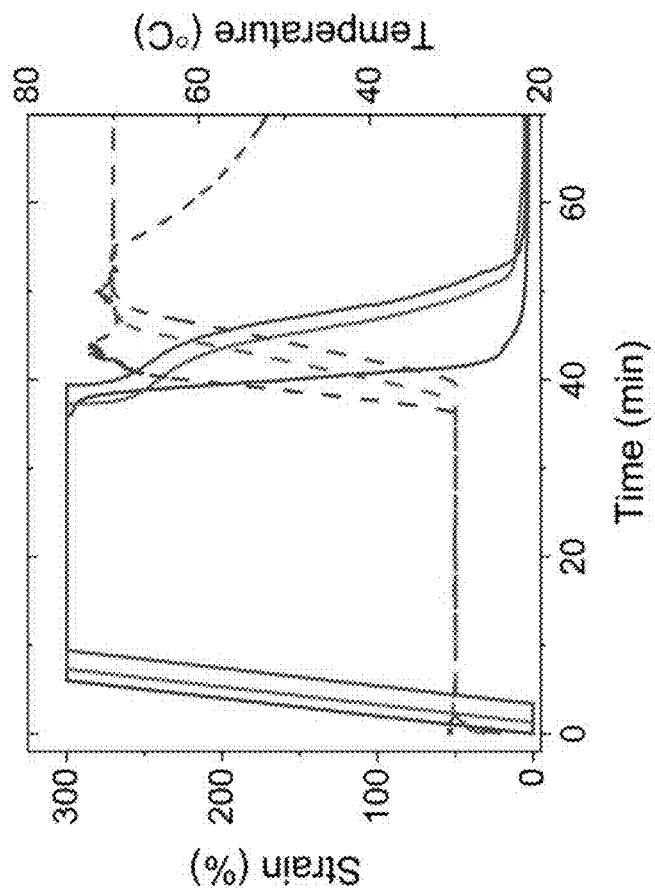
Figure 7B:
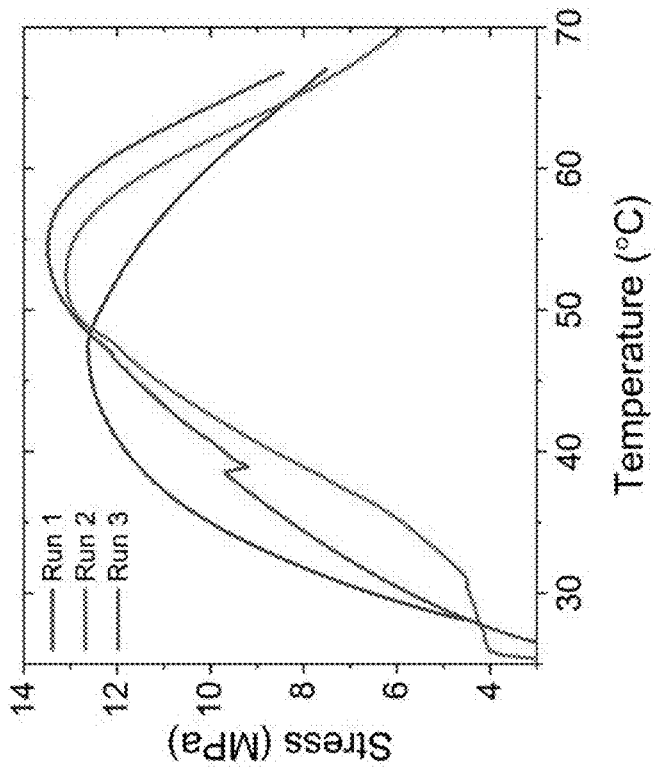

PPG-MPU exhibited clear shape programmability as shown in FIG. 2A, in which the polymer is stretched over 300% into a fixed state and then returns to its original length after heating to 70° C. The pristine stress-strain curve (FIG. 2B, FIG. 7) highlights the polymer's high tensile strength (70 MPa), modulus (1.2 GPa), extensibility (500%), and toughness (270 MPa). The high extensibility of flexible polymers with dynamic bonds has been attributed to the continual breaking and reforming of dynamic bonds, which enables chain sliding. Two additional interesting phenomena were observed during tensile testing (FIG. 2C). First, the polymer film changes from transparent to opaque white above ~300% strain, indicating the emergence of large domains similar to the formation of large nematic domains in liquid crystals or stress whitening in semicrystalline polymers. (See Kojima, M. Stress Whitening in Crystalline Propylene-Ethylene Block Copolymers. *Journal of Macromolecular Science, Part B* 1981, 19 (3), 523-541. https://doi.org/10.1080/00222348108015316; Wei, P.; Huang, J.; Lu, Y.; Zhong, Y.; Men, Y.; Zhang, L.; Cai, J. Unique Stress Whitening and High-Toughness Double-Cross-Linked Cellulose Films. *ACS Sustainable Chem. Eng.* 2019, 7(1), 1707-1717. https://doi.org/10.1021/acssuschemeng.8b05485) This coincides with strain hardening as seen by the slope increase in the stress-strain curve at 300%. Additionally, instead of necking to a clean break, PPG-MPU often fractures by way of many tendrils ripping apart, with lengths up to 1 cm. This observation is consistent with the formation of large and highly connected supramolecular domains and helps to explain the high stretchability of PPG-MPU compared to other polymers that possess a high weight percent of dynamic bonds but exhibit poor extensibility. (See Korley, L. T. J.; Pate, B. D.; Thomas, E. L.; Hammond, P. T. Effect of the Degree of Soft and Hard Segment Ordering on the Morphology and Mechanical Behavior of Semicrystalline Segmented Polyurethanes. *Polymer* 2006, 47 (9), 3073-3082. https:/% doi.org/10.1016/j.polymer.2006.02.093.))

Figure 8A:
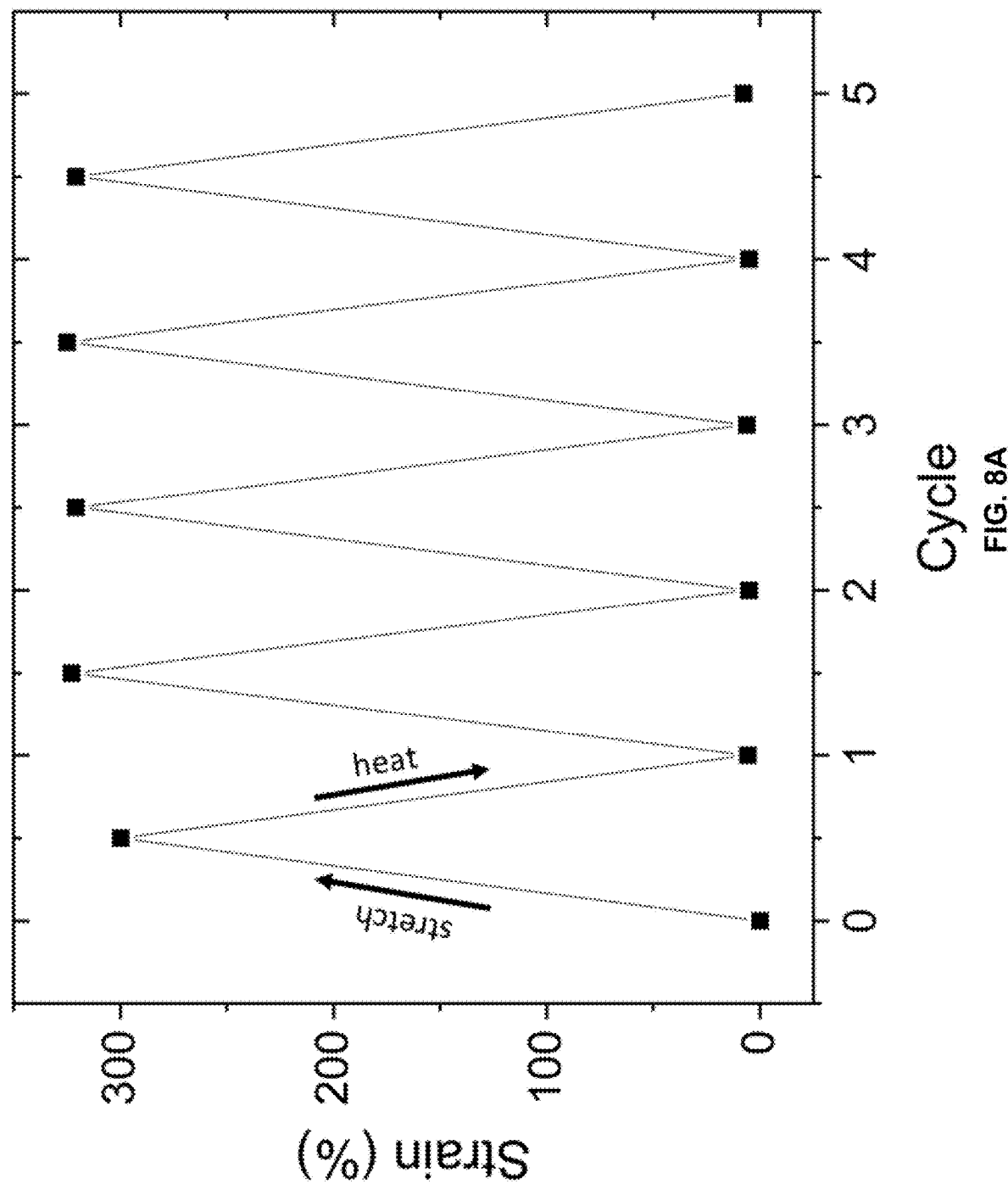
FIGS. 8A and 8B provide example cycling data for PPG-MPU according to embodiments.
Figure 8B:
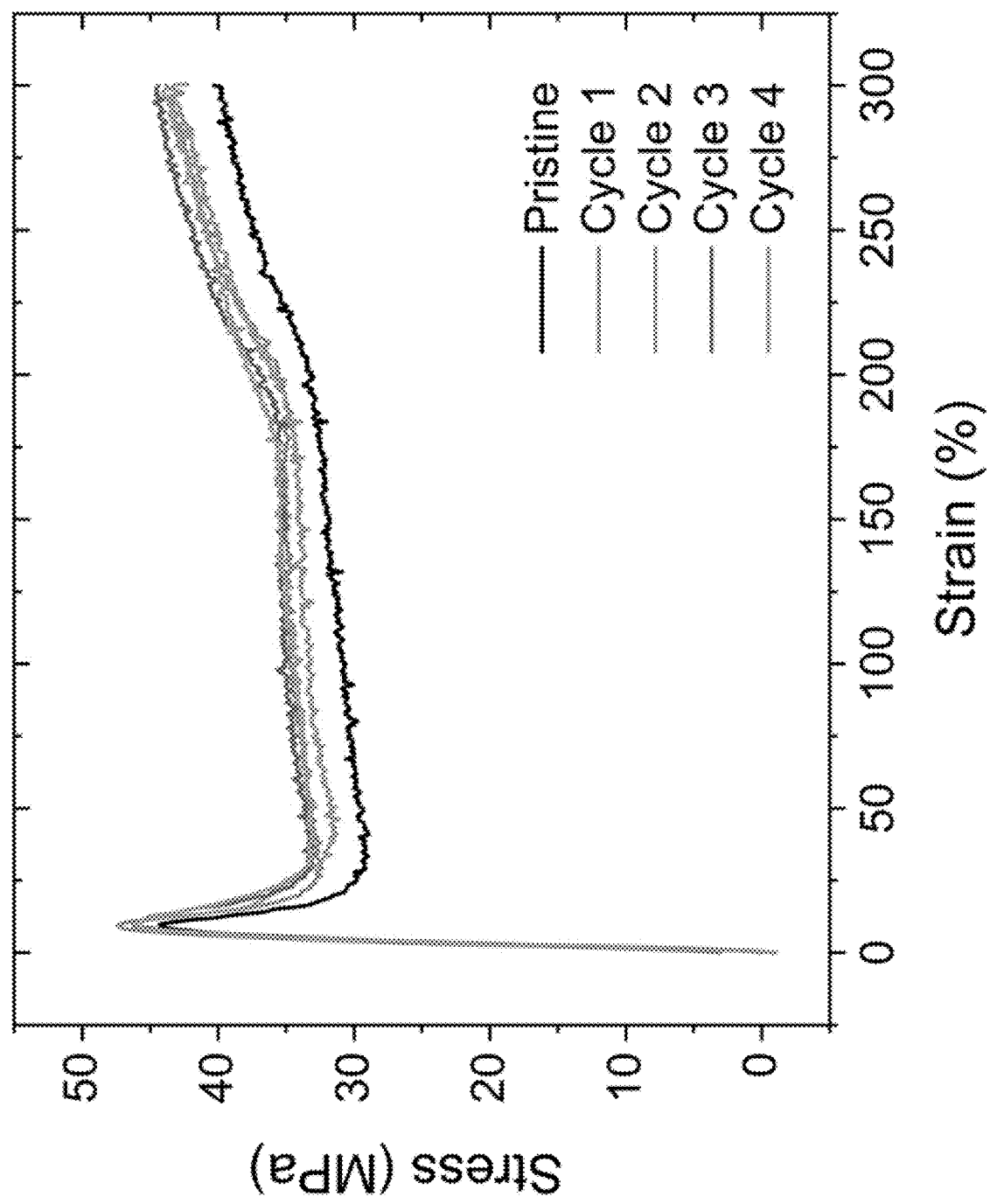
Figure 9A:
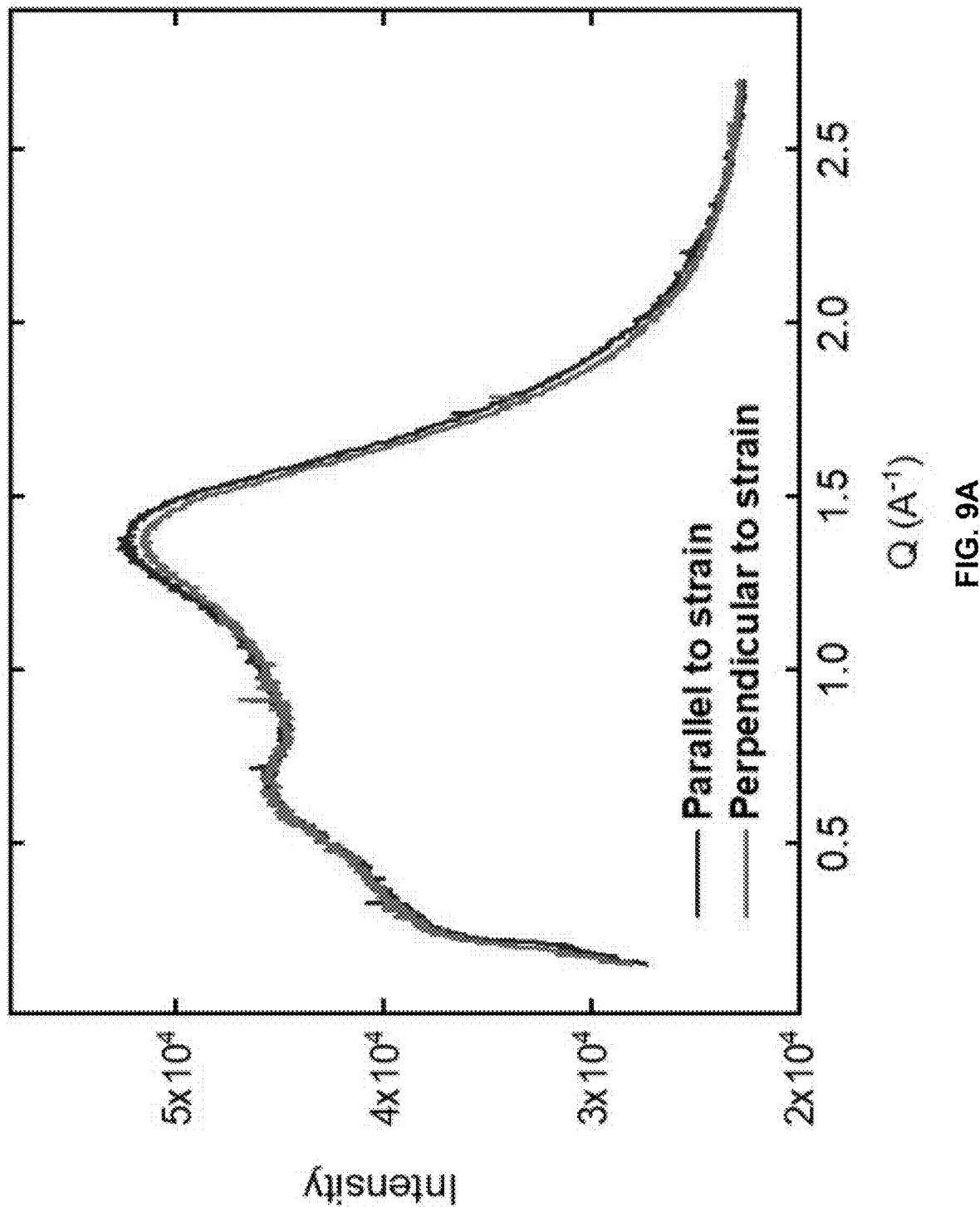
FIGS. 9A to 9C illustrate example aspects of Orientation of urea-urea H-bond stacking according to embodiments.
Figure 9C:
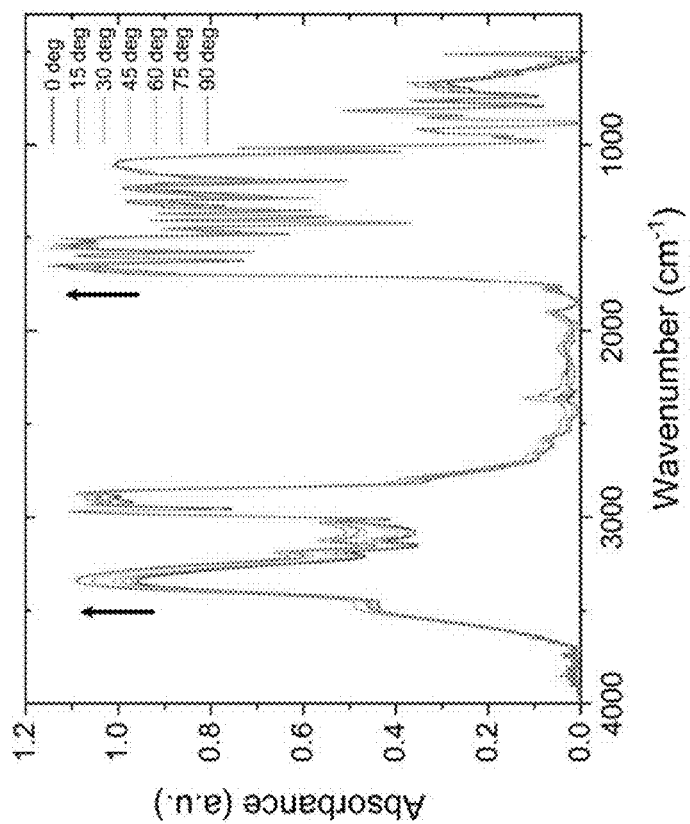
Figure 9B:
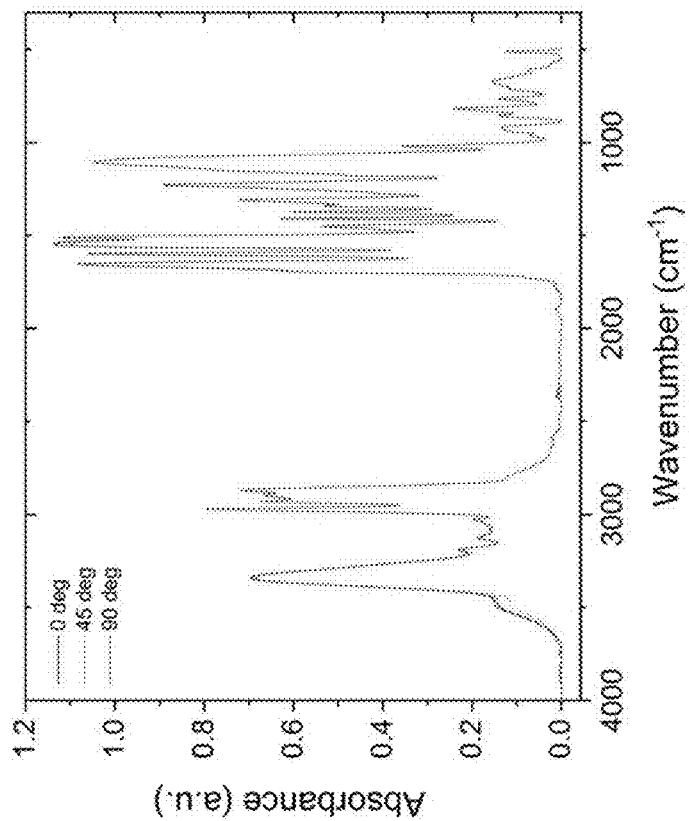

Next, characterized was the one-way shape memory behavior of the polymer through dynamic mechanical analysis. Remarkably, PPG-MPU exhibited a maximum recovery stress ($\sigma_{r,max}$) of 13.1±0.4 MPa (FIG. 2D, FIGS. 7A-C) and a maximum recoverable strain ($\varepsilon_{r,max}$) of 300% (FIG. 2E), corresponding to an estimated volumetric energy density ($E=\frac{1}{2}\sigma_{r,max}\varepsilon_{r,max}$) of 19.6±0.6 MJ/m³. Furthermore, PPG-MPU has a shape fixity and recovery of $R_f$=0.93±0.05 and $R_r$=0.99±0.01, respectively (FIG. 2E, FIGS. 7A-7C), allowing it to undergo multiple shape memory cycles with minimal hysteresis (FIGS. 8A&8B). Additionally, the low density (~1.09 g/cm³) of PPG-MPU leads to a high specific energy density of 17.9 J/g, approximately 460 times the energy density of skeletal muscle (0.039 J/g). (c.f. Madden, J. D. W.; Vandesteeg, N. A.; Anquetil, P. A.; Madden, P. G. A.; Takshi, A.; Pytel, R. Z.; Lafontaine, S. R.; Wieringa, P. A.; Hunter, I. W. Artificial Muscle Technology: Physical Principles and Naval Prospects. *IEEE Journal of Oceanic Engineering* 2004, 29 (3), 706-728. https://doi.org/10.1109/JOE.2004.833135)

Figure 2F:
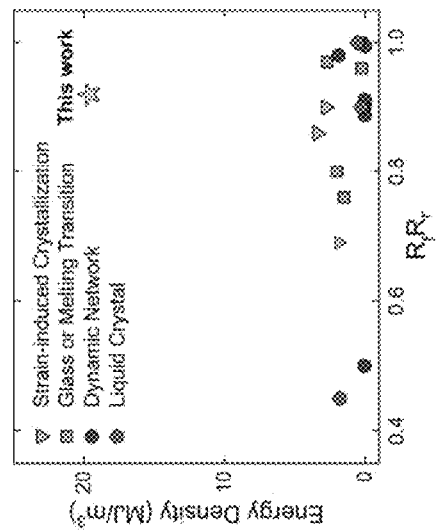
Figure 2E:
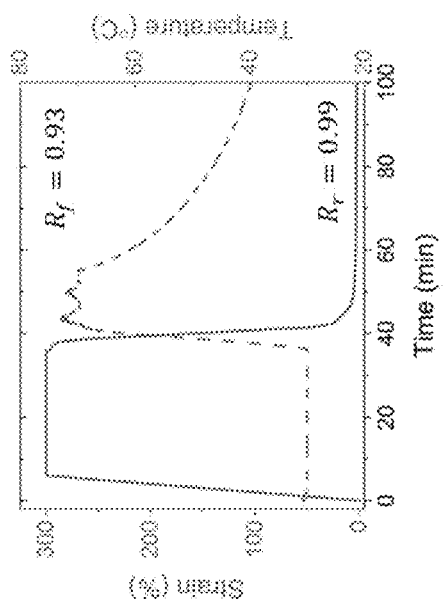
Figure 2D:
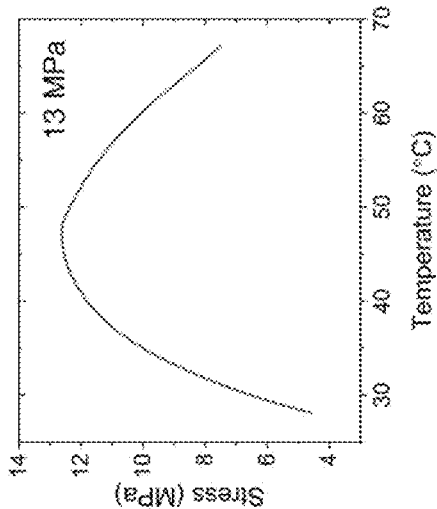

The combination of large extensibility with high recovery stress gives this polymer high energy density (almost six times greater than the previous highest energy density reported for a SMP) as plotted in FIG. 2F. Importantly, this high energy density is achieved simultaneously with high shape fixity and shape recovery (x-axis of FIG. 2F, where unity is ideal). Each polymer in FIG. 2F is classified based on the molecular level change that stabilizes the temporary state (e.g., strain-induced crystallization, glass or melting transition, dynamic networks, or liquid crystal, Table S1, below).

Thus, the polymer presented here represents the first example of a SMP that simultaneously possesses high energy density (19.6 MJ/m³ or 17.9 J/g), recovery stress (>10 MPa), extensibility (>500%), and shape fixity and recovery (>0.9). Next it was sought to compare these experimental recovery stress values to theoretical limits. The entropy change per volume $$\left(\frac{\Delta S}{V}\right)$$

associated with extending a network of gaussian chains with junction density ($v_j$) and extension ratio ($\alpha$) is given by:

$$\frac{\Delta S}{V} = \frac{kv_j}{2}\left(\alpha^2 + \frac{2}{\alpha} - 3\right) \quad (1)$$

The attainable recovery stress ($\sigma_r$) based on the release of this stored entropic energy at a given temperature (T) is then given by:

$$\sigma_r = \frac{f_x}{A} = \frac{1}{V}\frac{\partial(-T\Delta S)}{\partial \alpha} = kv_j T\left(\alpha - \frac{1}{\alpha^2}\right) \quad (2)$$

Equation (2) allows to estimate the maximum achievable recovery stress in the system, assuming the chains extend from a gaussian state ($<r> \sim N^{1/2}l$) to a near fully extended state ($<r> \sim Nl$) and a junction density equal to density over backbone molecular weight $$\left(v_j = \frac{\rho}{M_b} = 0.0027\frac{\text{mol}}{\text{cm}^3}\right).$$

This results in an estimated maximum recovery stress ($\sigma_{r,max}$) of 20 MPa, similar to the experimentally observed recovery stress of 13.1 MPa.

In addition, one can use the estimated entropic energy required to achieve this high level of chain extension to determine the minimum enthalpic gain needed to stabilize the extended chains ($\Delta G = \Delta H - T\Delta S < 0$). From equation (1), estimated was the entropic change to be 0.12 J/cm³ K, which implies a minimum enthalpic gain of ~15 KJ/mol. Previous studies have estimated the enthalpy associated with each urea-urea hydrogen bond to be a similar value (~15 KJ/mol). (See Masunov, A.; Dannenberg, J. J. Theoretical Study of Urea and Thiourea. 2. Chains and Ribbons. *J. Phys. Chem. B* 2000, 104 (4), 806-810 https://doi.org/10.1021/jp993078e; Morrison, C. A.; Siddick, M. M. Determining the Strengths of Hydrogen Bonds in Solid-State Ammonia and Urea: Insight from Periodic DFT Calculations. *Chemistry—A European Journal* 2003, 9 (3), 628-634 https://doi.org/10.1002/chem.200390067.) Since MPU forms between 2-4 urea-urea hydrogen bonds, the estimated enthalpic gain from bond formation is 2-4 times higher (~30-60 kJ/mol) than the required minimum amount, suggesting that the observed level of stored entropic energy is reasonable (~25-50% of the maximum based on the bond strength of MPU). This analysis supports the attribution of PPG-MPU's high energy density to the additional entropic energy stored due to the strain-induced formation of supramolecular nanostructures.

Structural Characterization

Figure 3B:
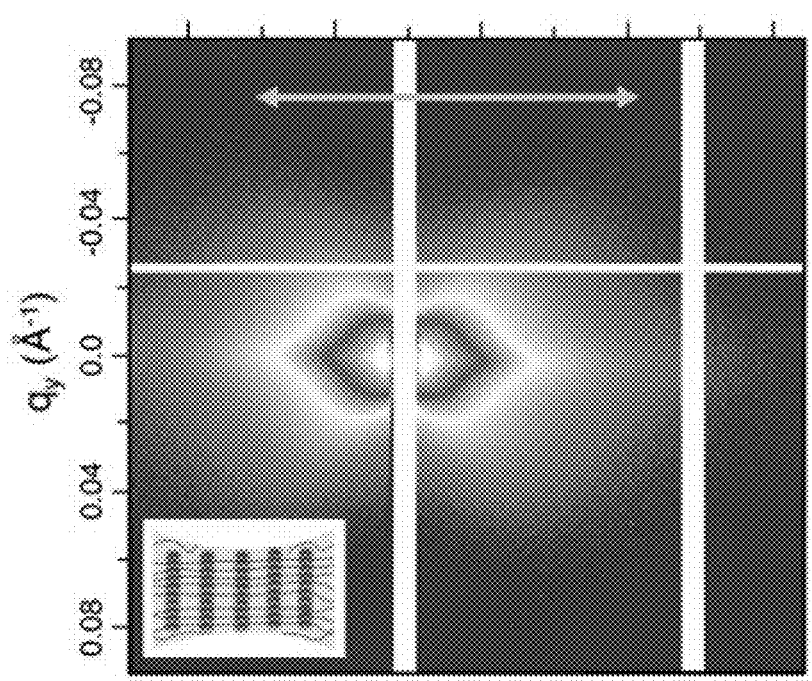
FIGS. 3A to 3I provide an example Structural characterization of strain-induced supramolecular nanostructures according to embodiments.
Figure 3A:
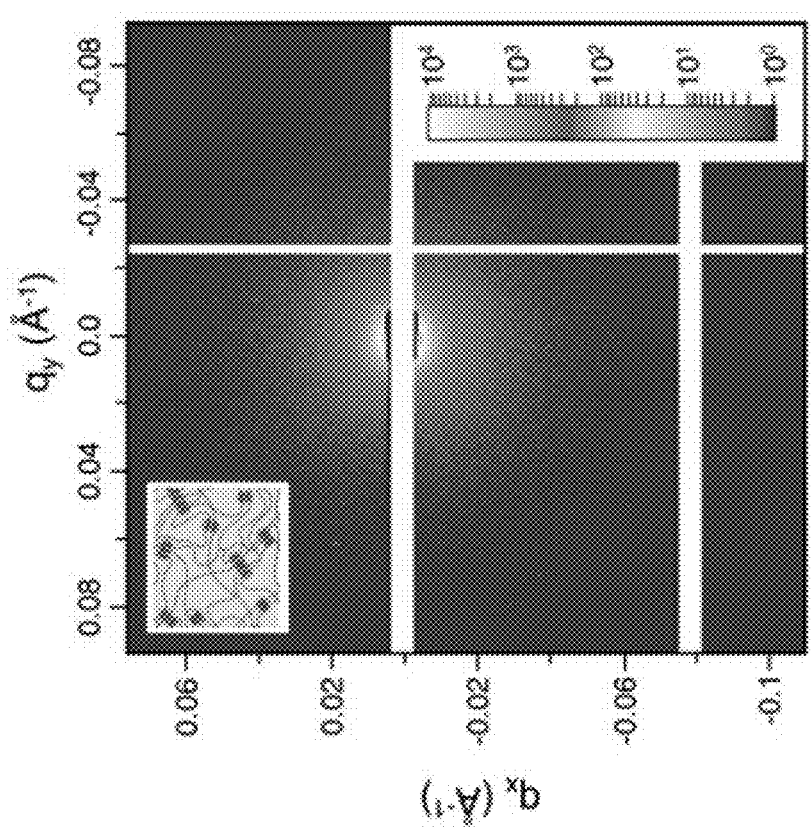
Figure 3C:
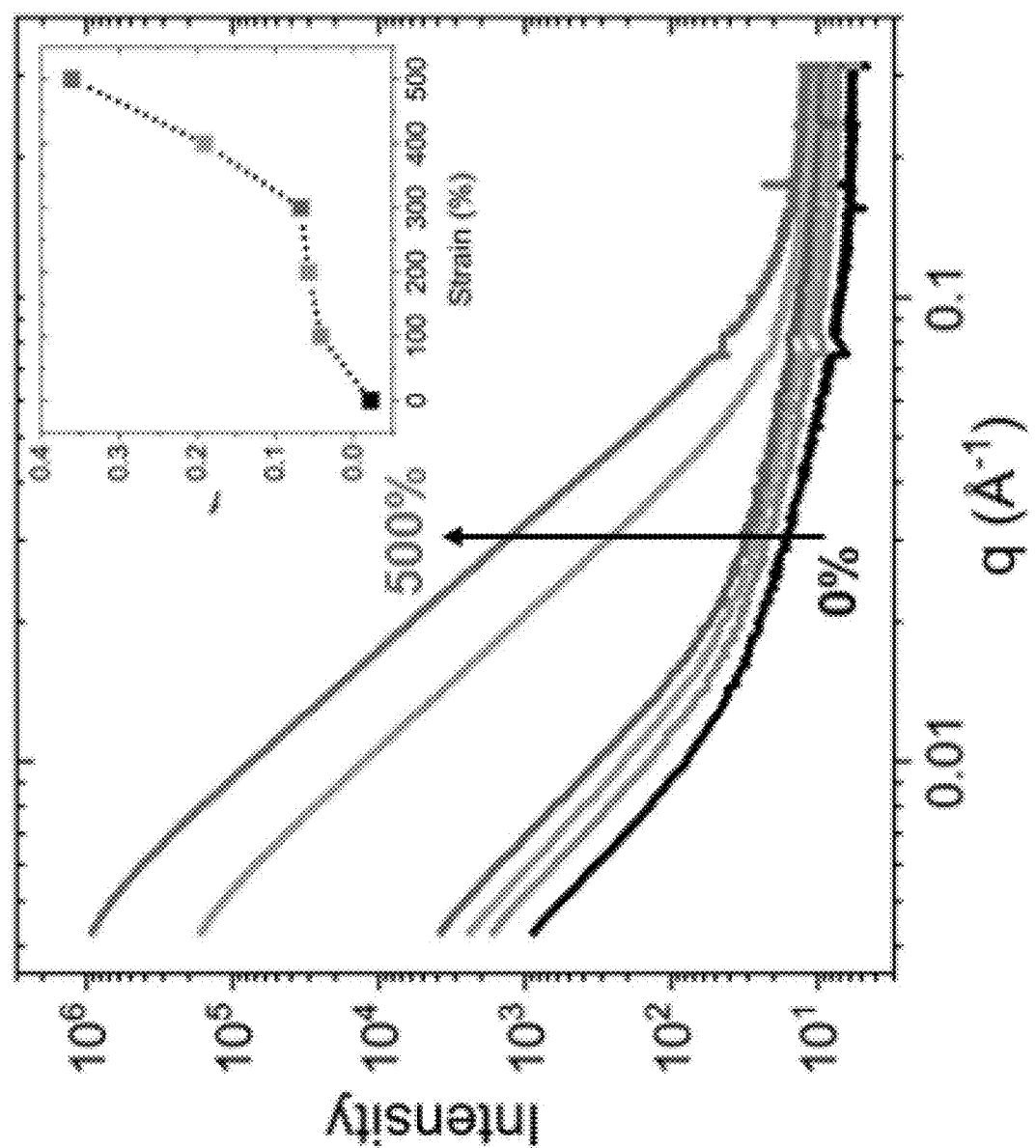

To better understand the molecular and microstructural origins of PPG-MPU's advantageous shape memory properties, collected were 2D transmission small-angle x-ray scattering (SAXS) images of the polymer bulk film at 0% and 500% strain (FIGS. 3A and 3B). The strained film exhibits a much higher intensity and markedly anisotropic scattering pattern, similar to scattering patterns of oriented, uniaxially-deformed polyethylene. (See Romo-Uribe, A.; Manzur, A.; Olayo, R. Synchrotron Small-Angle x-Ray Scattering Study of Linear Low-Density Polyethylene under Uniaxial Deformation. *Journal of Materials Research* 2012, 27 (10), 1351-1359. https://doi.org/10.1557/jmr.2012.83; López-Barrón, C. R.; Zeng, Y.; Schaefer, J. J.; Eberle, A. P. R.; Lodge, T. P.; Bates, F. S. Molecular Alignment in Polyethylene during Cold Drawing Using In-Situ SANS and Raman Spectroscopy. *Macromolecules* 2017, 50 (9), 3627-3636. https://doi.org/10.1021/acs.macromol.7b00504.) The high intensity regions lie in line with the stretching direction, suggesting that periodic structures orient perpendicular to strain as indicated in the inset. Averaging the intensity parallel to the stretching direction shows a consistent increase in intensity with increasing strain across the entire q-range below 0.2 Å⁻¹ (FIG. 3C). Furthermore, one can estimate the change in anisotropy as a function of strain by calculating Herman's orientation parameter (f), with the stretching direction defined as the 0° axis:

$$f = \frac{1}{2}(3<\cos^2\theta> - 1) \quad (3)$$

where $<\cos_2\theta>$ is the mean-square cosine given by:

$$<\cos^2\theta> = \frac{\int_0^{\frac{\pi}{2}} \cos^2\theta * I(\theta) * \sin\theta \, d\theta}{\int_0^{\frac{\pi}{2}} I(\theta) * \sin\theta \, d\theta} \quad (4)$$

The inset of FIG. 3C plots the orientation parameter as a function of strain, with f=0 representing an isotropic state and f=1 representing perfect alignment perpendicular to strain. Anisotropy increases with increasing strain, reaching almost 0.4 at 500% strain, a similar value to that of cold-drawn polyethylene. These data support the hypothesis that during strain, polymer chains align along the stretching axis and simultaneously organize the dynamic bonds into large supramolecular nanostructures. These structures significantly increase both overall scattering intensity (due to the emergence of highly periodic structures) and anisotropy (due to their preferred orientation perpendicular to strain).

Figure 3E:
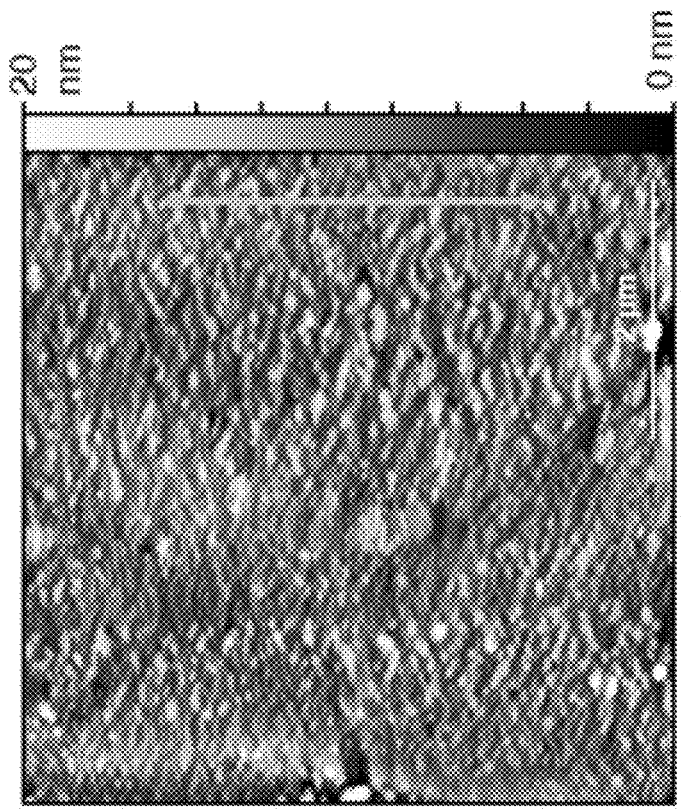
Figure 3D:
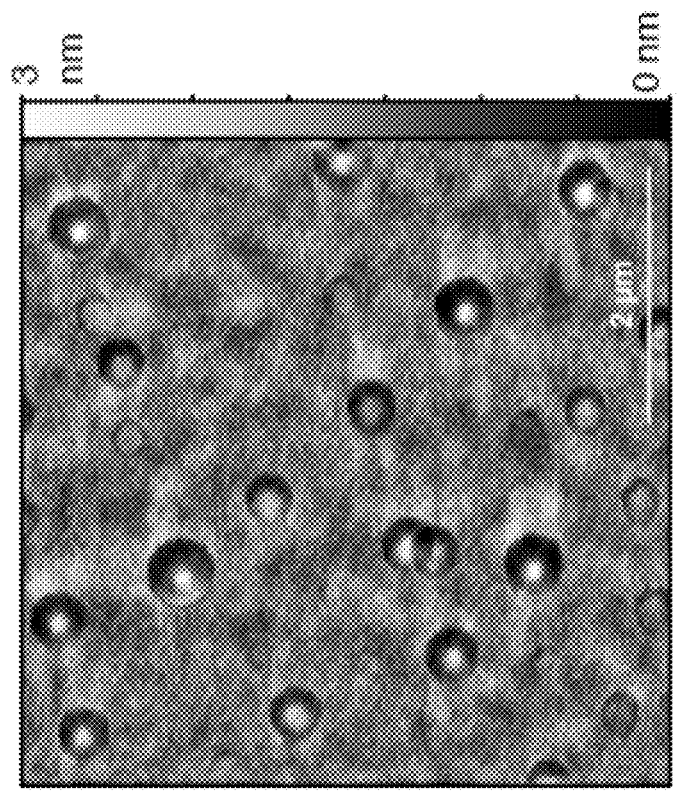
Figure 3F:
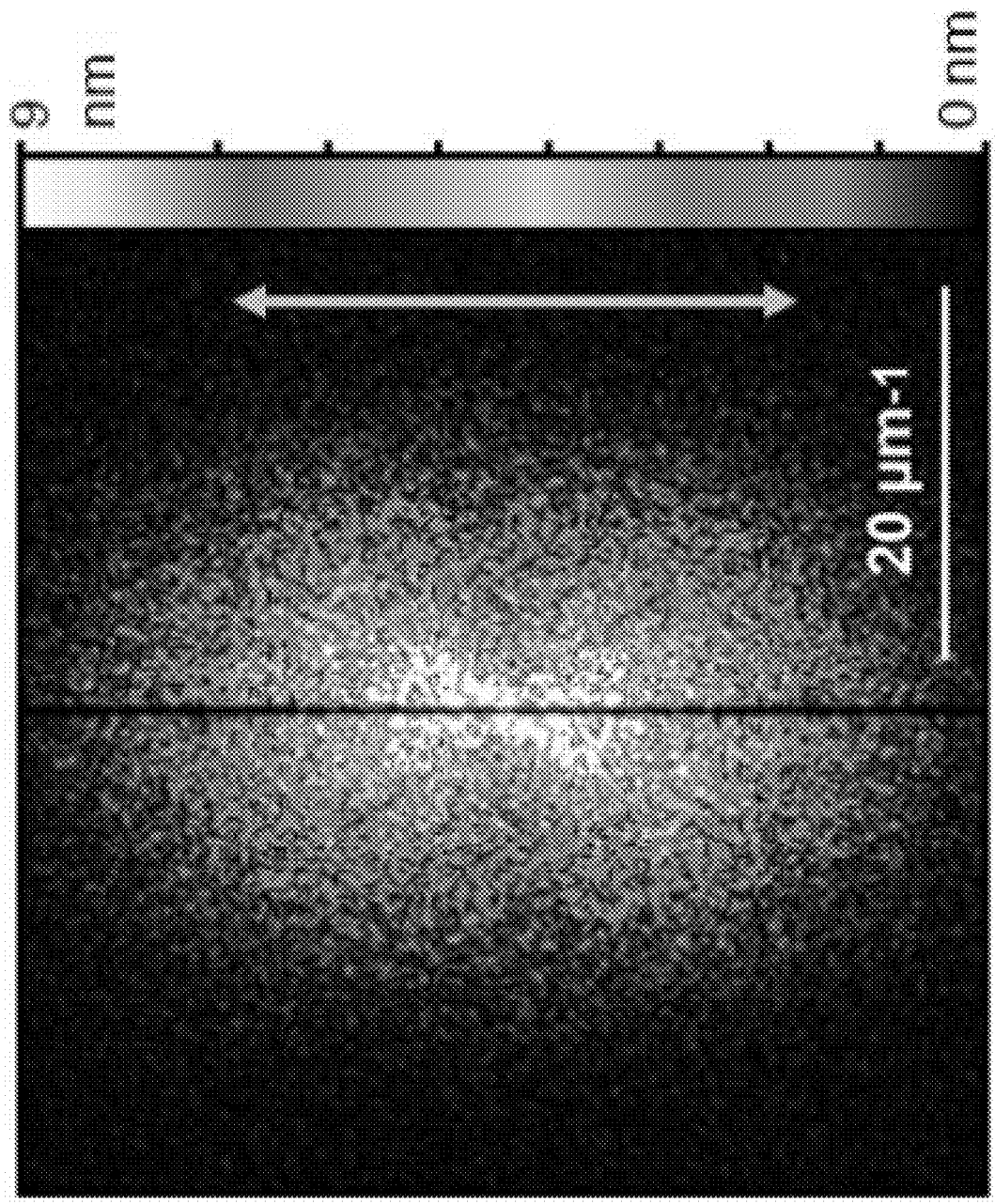
Figure 3G:
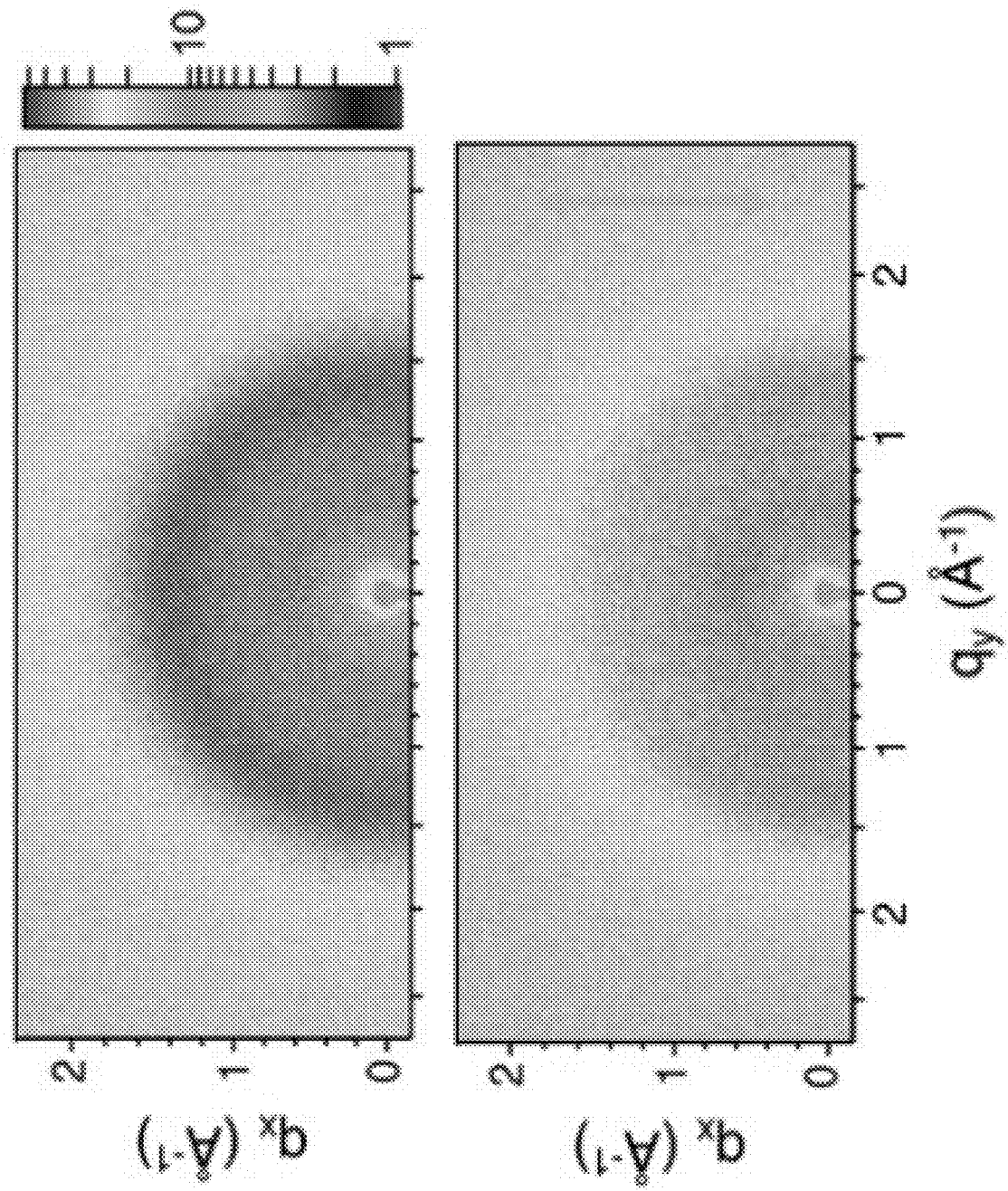
Figure 3I:
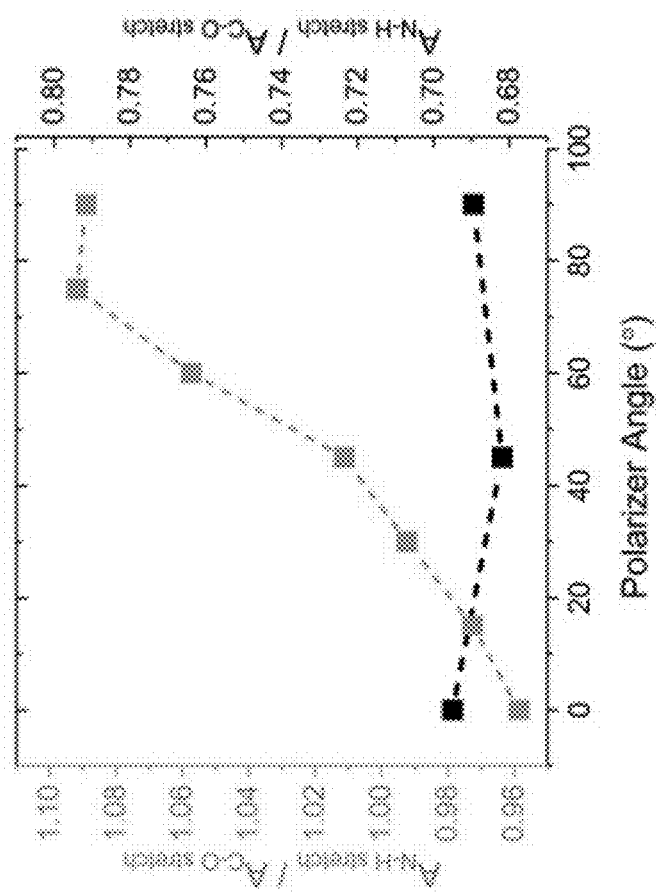
Figure 10:
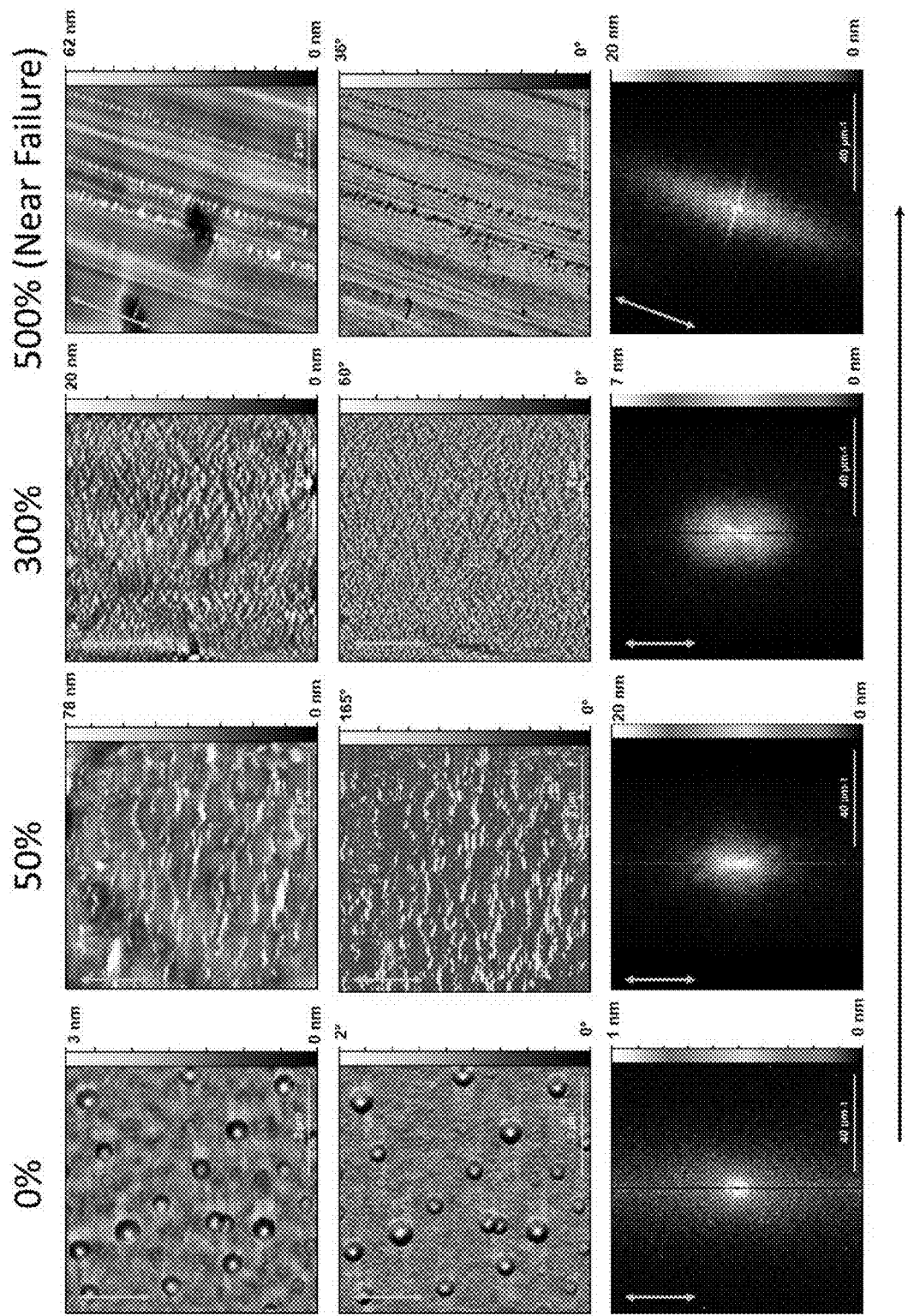
FIG. 10 provides example AFM images of PPG-MPU under strain. AFM height (top row), phase (middle row), and 2D-FFT (bottom row) images at 0%, 50%, 300%, and near failure (from left to right) strains. The stretching direction is marked by the blue arrow.

To visualize the supramolecular nanostructures, performed was atomic force microscopy (AFM). While PPG-MPUinitially exhibits an isotropic and amorphous structure (FIG. 3D), during straining, ordered nanostructures clearly emerge (FIG. 3E, FIG. 10). Performing a 2D Fast Fourier Transform (2D-FFT) on the AFM in FIG. 3E (i.e., converting the real-space height profile into reciprocal space) allows for a qualitative comparison to the transmission SAXS data. Remarkably, the shape of the 2D-FFT image (FIG. 3F) resembles that of the 2D-SAXS data (FIG. 3B), suggesting that despite AFM being a surface technique, the observed nanostructures exist throughout the bulk film. (See Henry, C. K.; Sandoz-Rosado, E.; Roenbeck, M. R.; Magagnosc, D. J.; Palmese, G. R.; Strawhecker, K. E.; Alvarez, N. J. Direct Measure of Crystalline Domain Size, Distribution, and Orientation in Polyethylene Fibers. *Polymer* 2020, 202, 122589. https://doi.org/10.1016/j.polymer.2020.122589.)

Figure 3H:
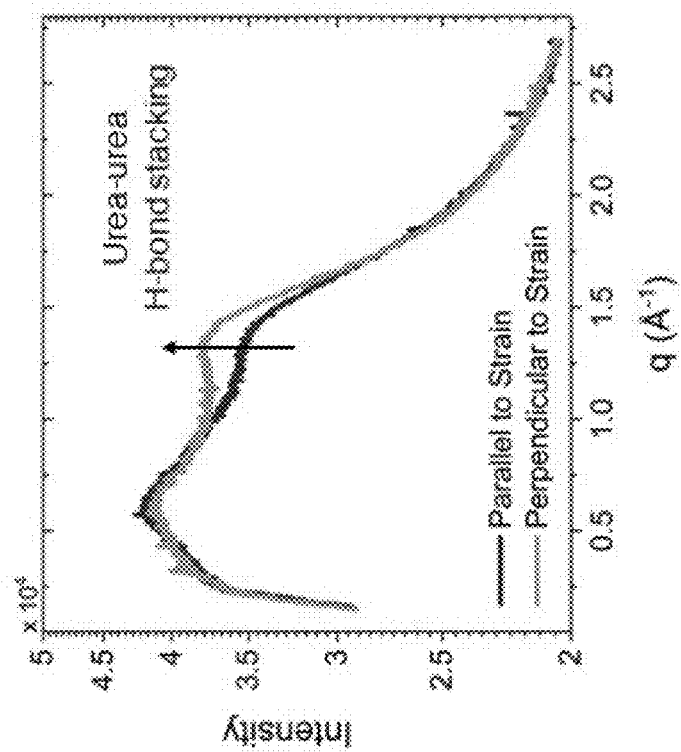

2D transmission wide-angle x-ray scattering (WAXS) data of unstrained PPG-MPU shows two broad peaks at 0.75 and 1.37 Å$^{-1}$, corresponding to 8.4 Å and 4.6 Å, respectively (FIG. 3G, FIGS. 9A-9C). The latter matches the expected urea-urea stacking distance for two hydrogen bonded urea groups, (see Swaminathan, S.; Craven, B. M.; McMullan, R. K. The Crystal Structure and Molecular Thermal Motion of Urea at 12, 60 and 123 K from Neutron Diffraction. *Acta Cryst B* 1984, 40 (3), 300-306. https://doi.org/10.1107/S0108768184002135) while attributed was the former to the amorphous halo from the backbone PPG chains. (See Halasa, A. F.; Wathen, G. D.; Hsu, W. L.; Matrana, B. A.; Massie, J. M. Relationship between Interchain Spacing of Amorphous Polymers and Blend Miscibility as Determined by Wide-Angle X-Ray Scattering. *J. Appl. Polym. Sci.* 1991, 43 (1), 183-190 https:/% doi.org/10.1002/app.1991.070430115; Zhao, J.; Chen, P.; Lin, Y.; Chang, J.; Lu, A.; Chen, W.; Meng, L.; Wang, D.; Li, L. Stretch-Induced Crystallization and Phase Transitions of Poly(Dimethylsiloxane) at Low Temperatures: An in Situ Synchrotron Radiation Wide-Angle X-Ray Scattering Study. *Macromolecules* 2018, 51 (21), 8424-8434 https://doi.org/10.1021/acs.macromol.8b01872.) Straining the sample results in an anisotropic scattering pattern that lacks any sharp peaks that would be expected for strain-induced crystallization of the polymer chains. The strained PPG-MPU sample exhibits a marked increase in the intensity of the urea-urea hydrogen bond peak perpendicular to strain compared to parallel to strain, consistent with alignment of periodic urea-urea hydrogen bonds oriented perpendicular to strain (FIG. 3H). Thus, the WAXS data suggests that the periodic structures seen via SAXS are composed of aligned urea-urea hydrogen bonds. Further confirmed was the molecular orientation of the polymer chains using polarized transmission Fourier-transform infrared spectroscopy (FTIR), which shows a clear orientation of the N—H stretching (~3350 cm$^{-1}$) and C=O stretching (~1720 cm$^{-1}$) of the urea groups perpendicular to the straining axis compared to the intensity of the C—O stretch (~1100 cm$^{-1}$) of the PPG backbone (FIG. 3I, FIGS. 9A-9C).

Figure 4A:
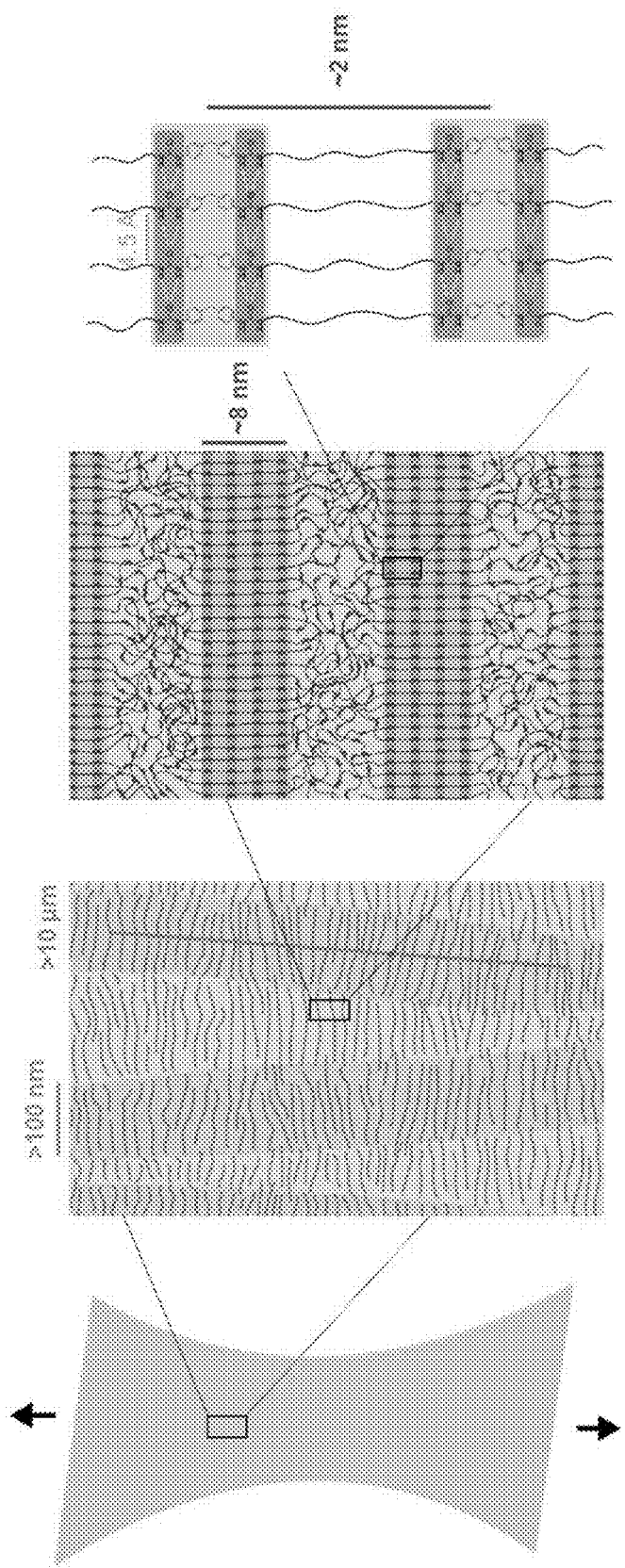
FIGS. 4A to 4D illustrate example aspects of Hierarchical nanostructure formation in highly strained PPG-MPU according to embodiments.

The above structural characterization reveals two key features of the strain-induced supramolecular structures: (1) uniform, periodic nanofibers oriented perpendicular to strain and (2) long fibrils oriented parallel to strain that arise between neighboring regions of banded nanofibers. These features are schematically illustrated in FIG. 4A, which shows the proposed hierarchical organization of PPG-MPU at high strain. At the macroscopic scale, bulk films of strained PPG-MPU show a clearly oriented structure from both SAXS (FIG. 3B) and polarized optical microscopy images (FIG. 4B). At the micron-scale, elongated fibril regions consisting of banded nanofibers emerge in AFM images at high strain (FIG. 4C, FIGS. 13A-13D). Even though the average chain has a $M_n$ of only 10 kDa, which is less than 50 nm when fully extended, these well-defined fibrils extend over 10 µm in length or 200 chain contour lengths (FIGS. 13A-13D). The emergence of these fibrils is likely linked to the mechanical failure of the bulk film into macroscopic tendrils over ~1 cm in length as shown in FIG. 2C.

Figure 4C:
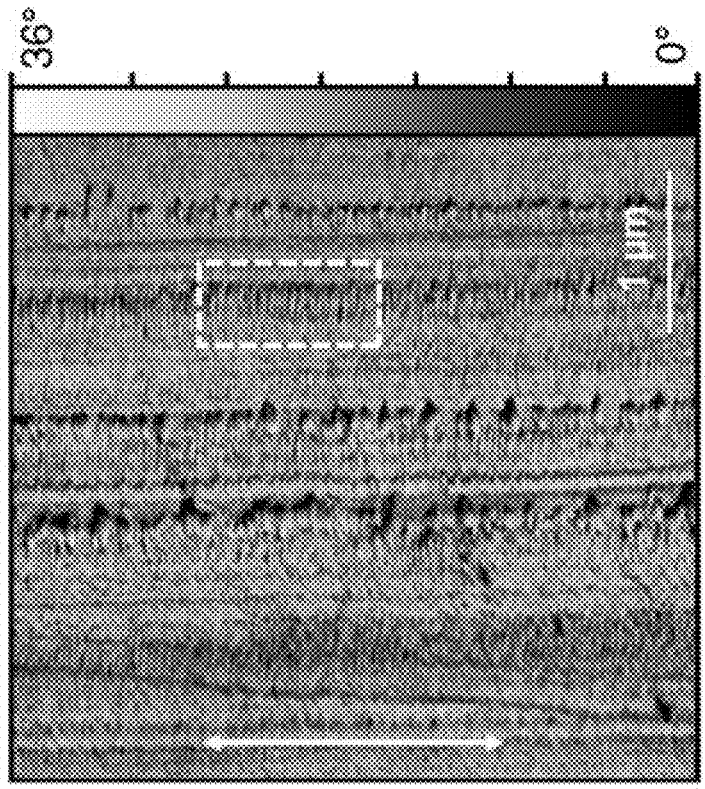
Figure 4B:
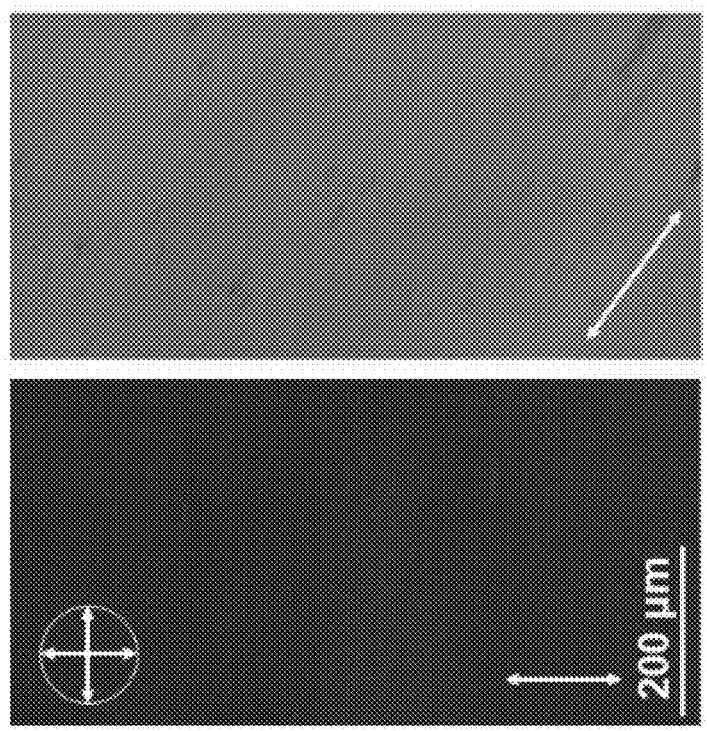
Figure 4D:
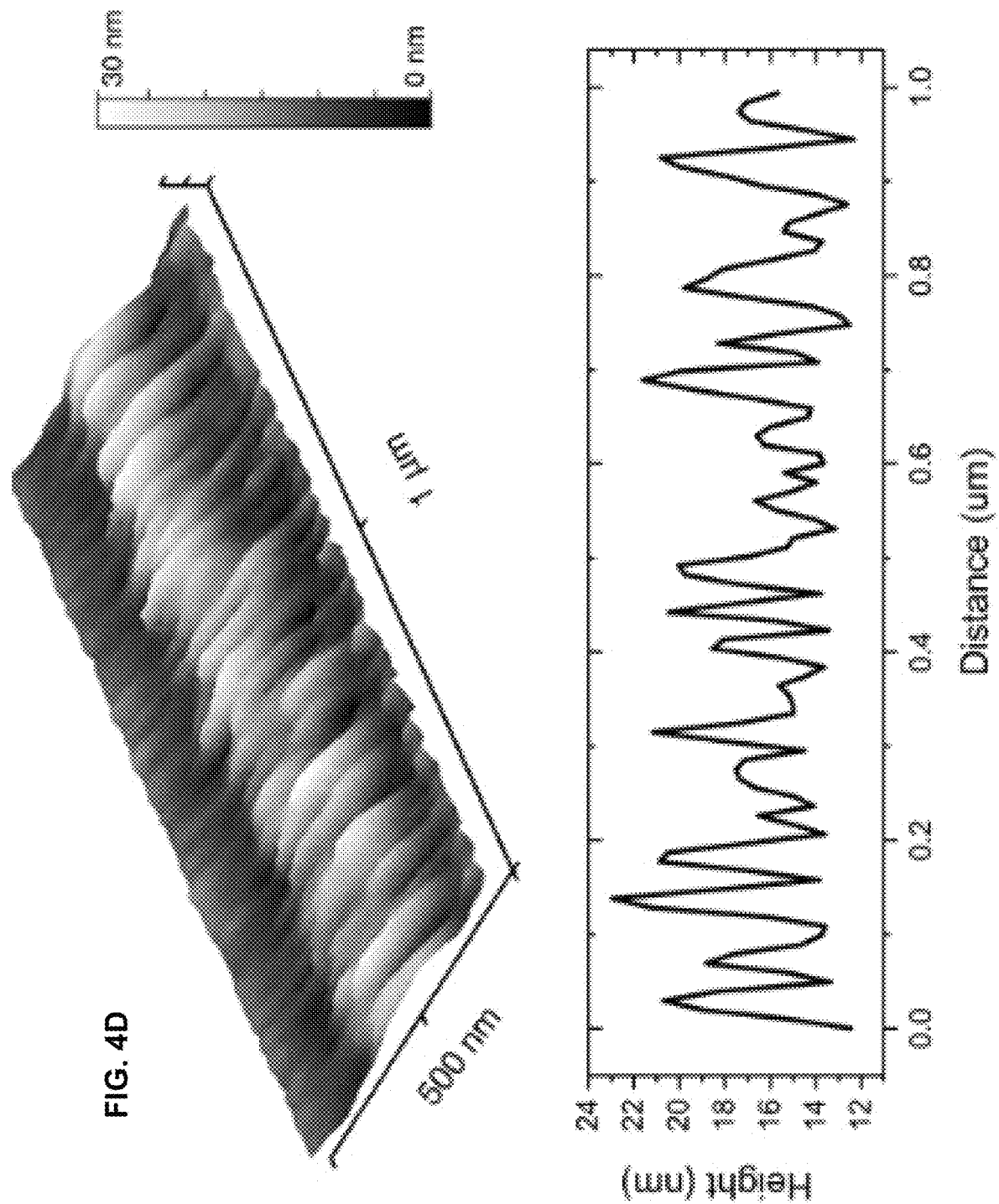
Figure 11A:
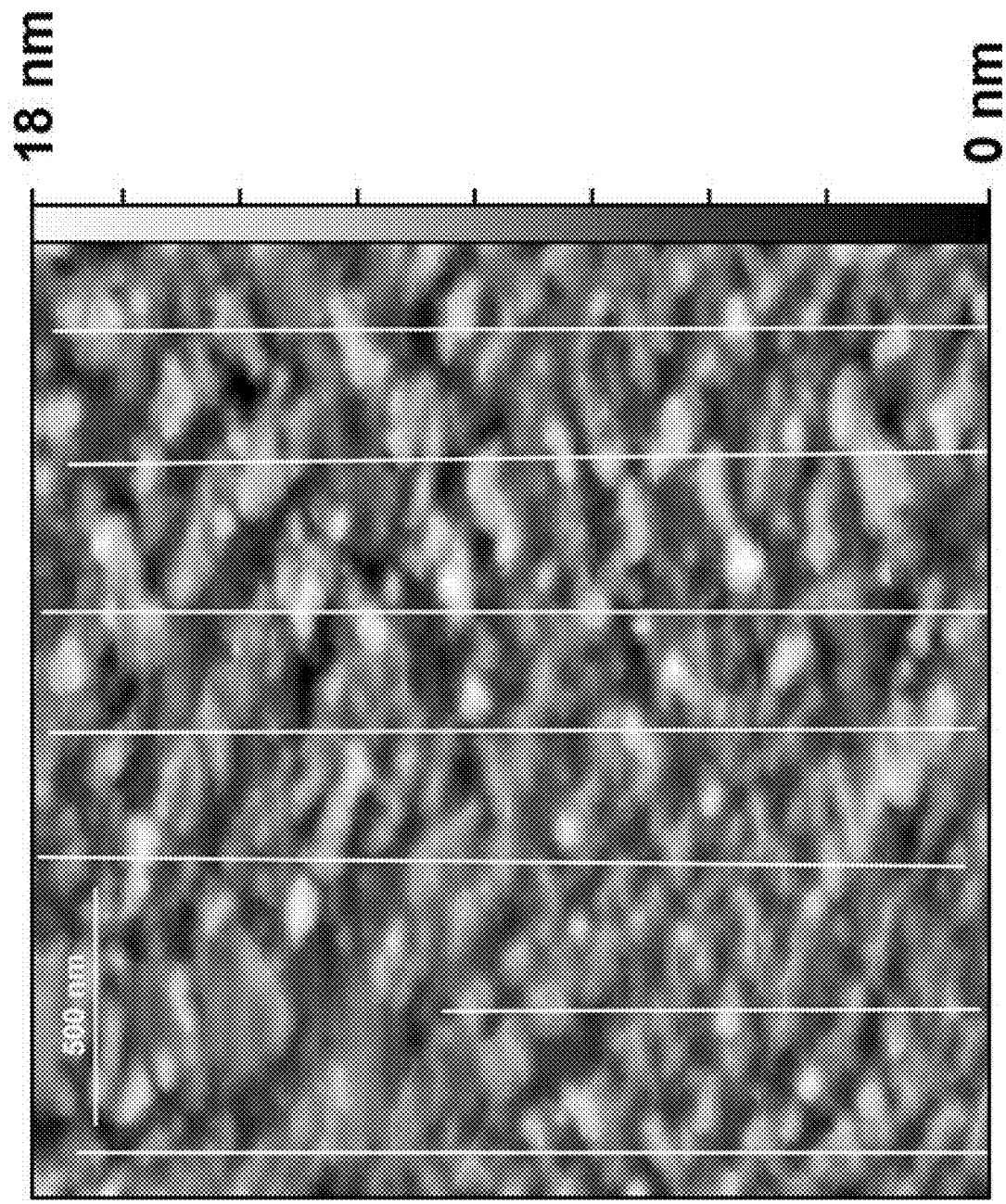
FIGS. 11A and 11B illustrate an example Estimate of fiber diameter from AFM data according to embodiments.
Figure 11B:
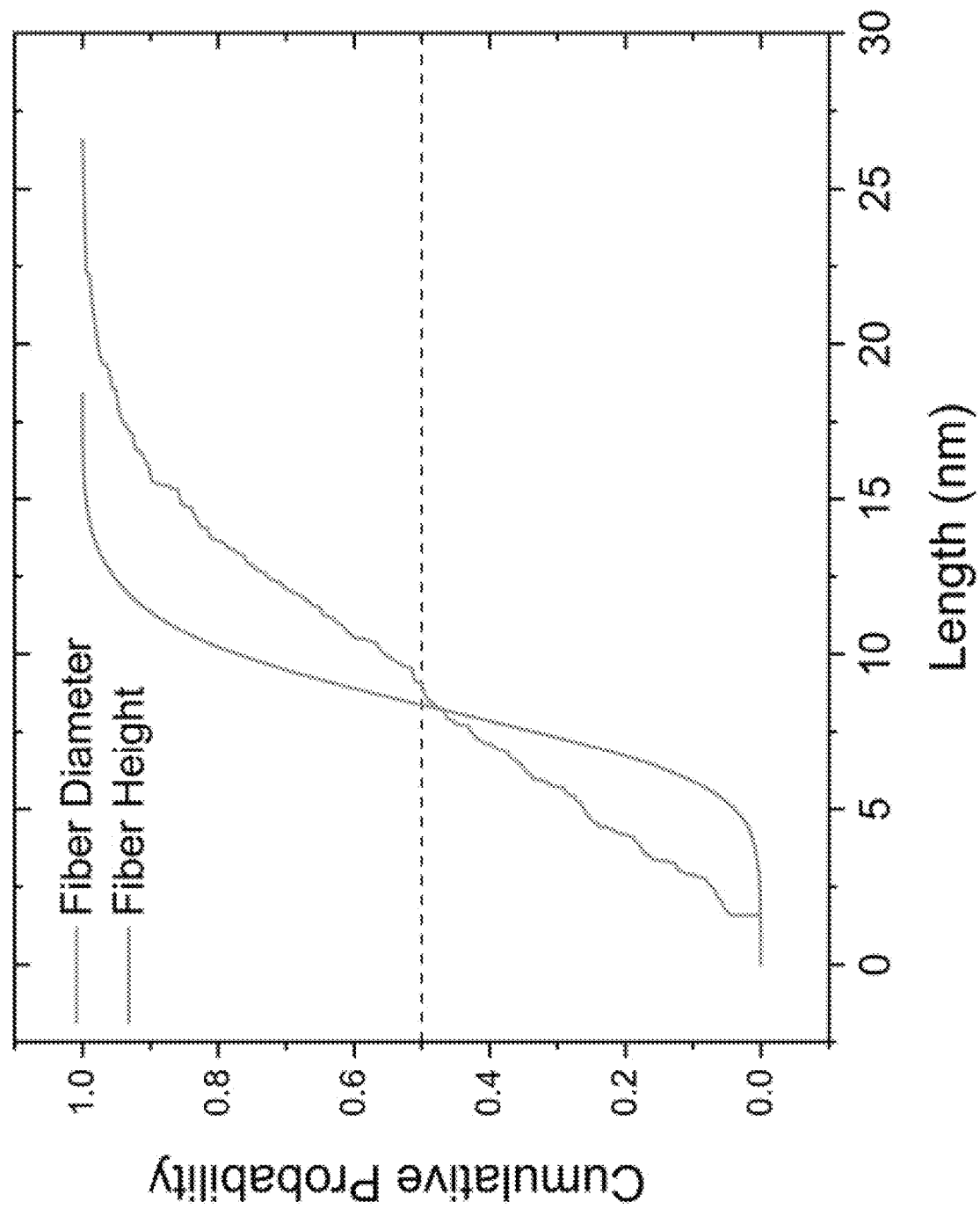
Figure 12A:
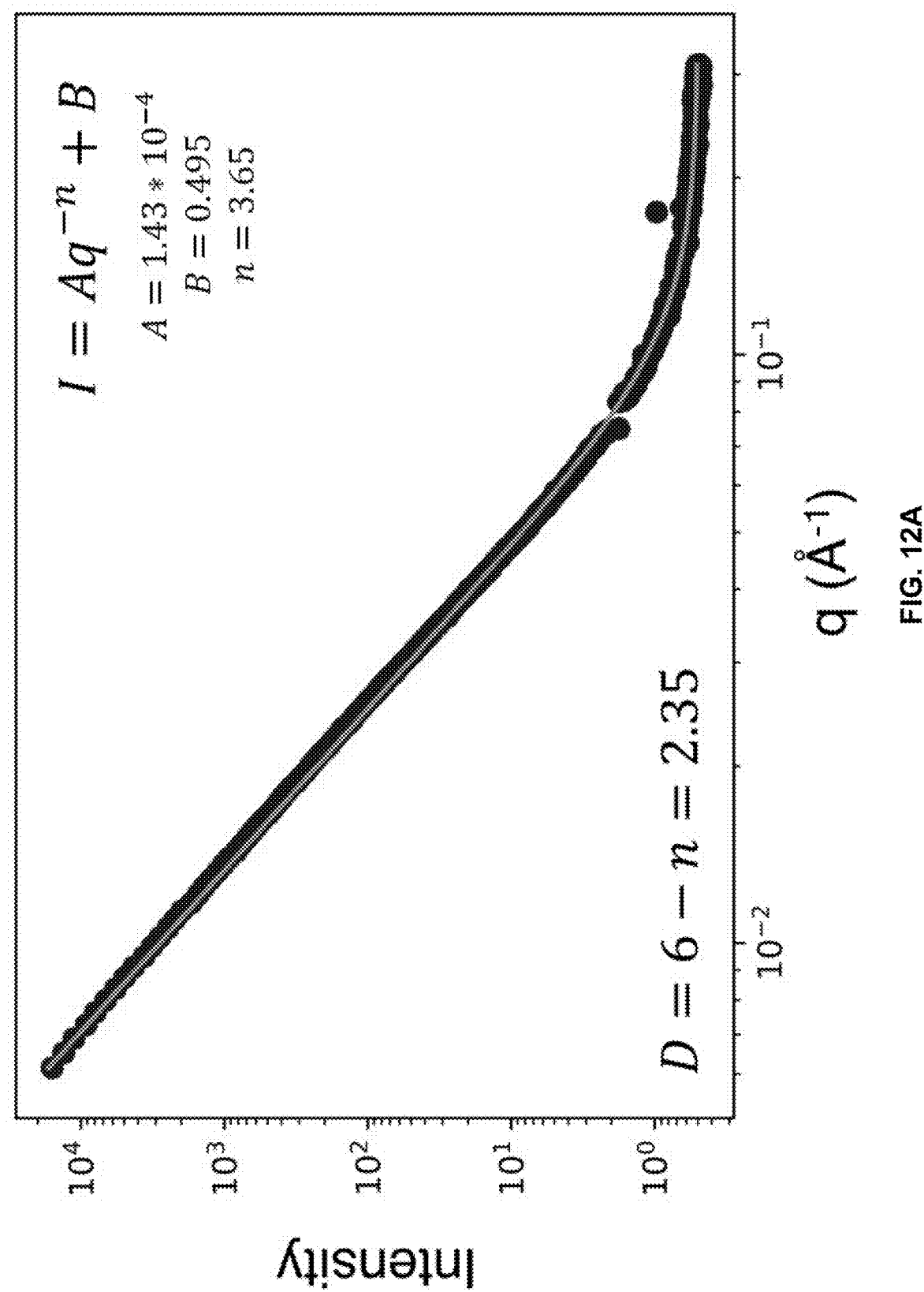
FIGS. 12A and 12B provide an example surface fractal analysis of strained PPG-MPU films according to embodiments.
Figure 12B:
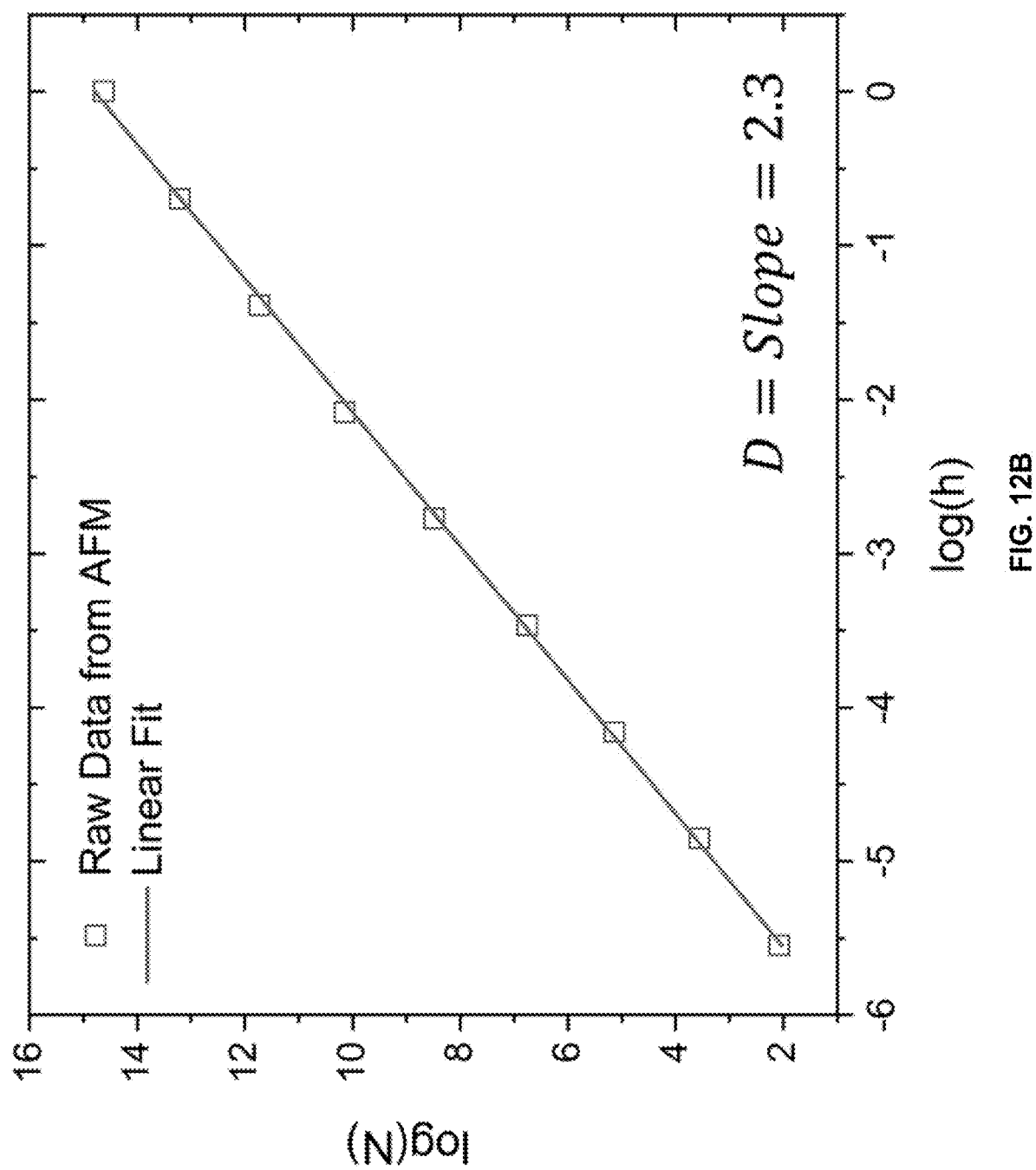
Figure 13A:
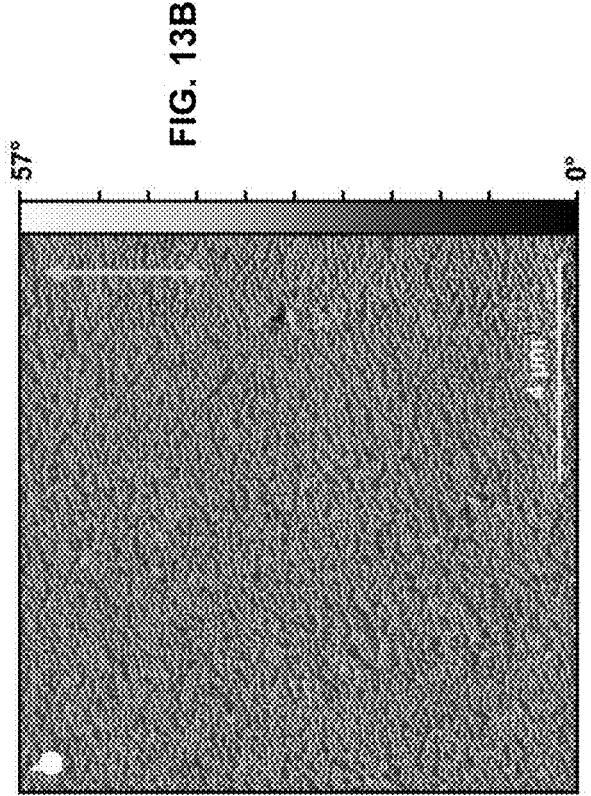
FIGS. 13A to 13D are additional example AFM images according to embodiments. Corresponding height (FIGS. 13A and 13C) and phase (FIGS. 13B and 13D) images of PPG-MPU at 300% strain, with stretching direction marked by the blue arrow. The 10 μm images show the widespread and uniform formation of the supramolecular nanofibers perpendicular to strain as well as the emergence of long fibrils that span the length of the AFM image.
Figure 13B:
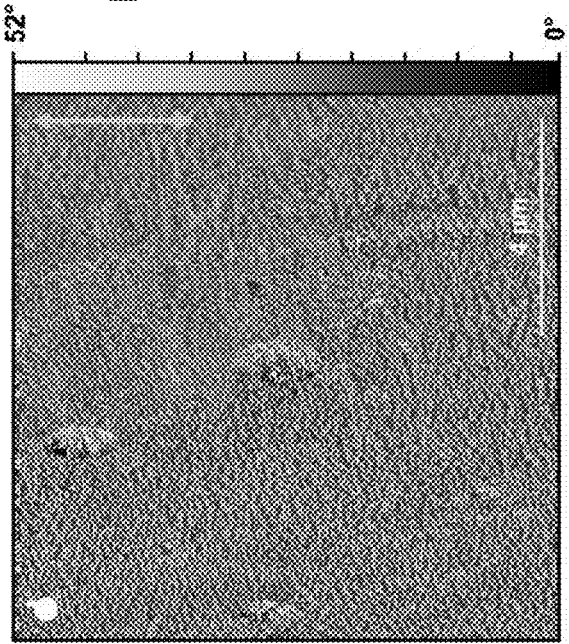
Figure 13C:
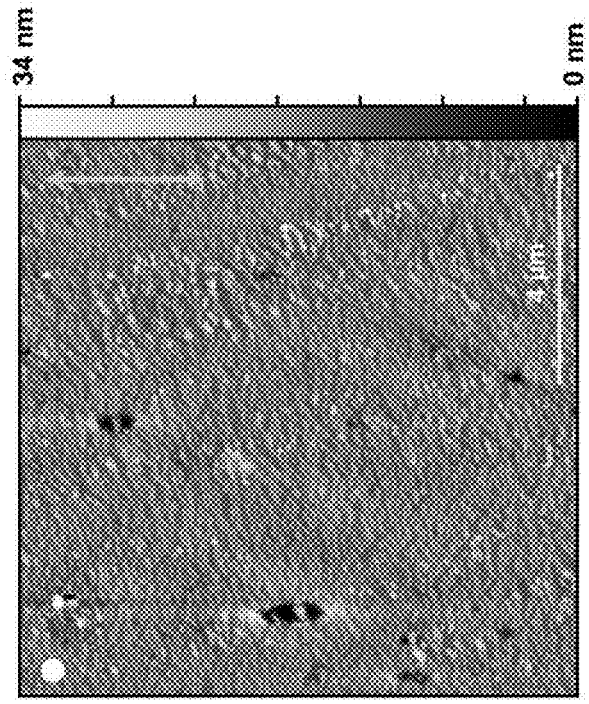
Figure 13D:
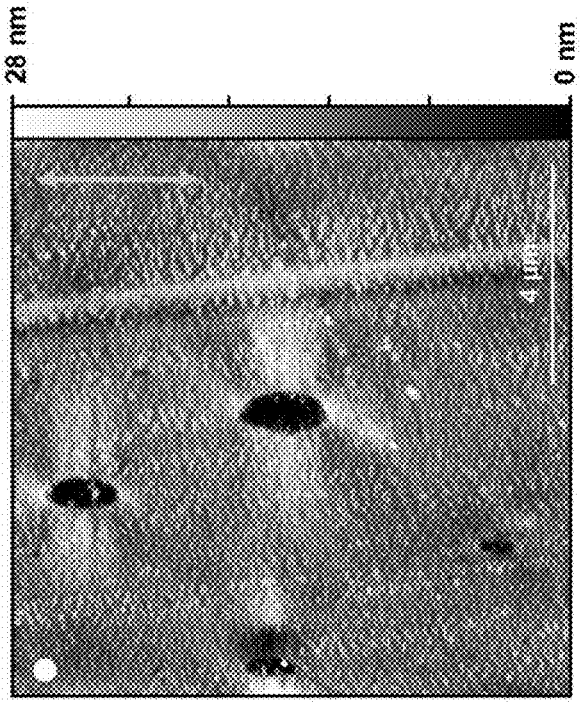
Figure 14A:
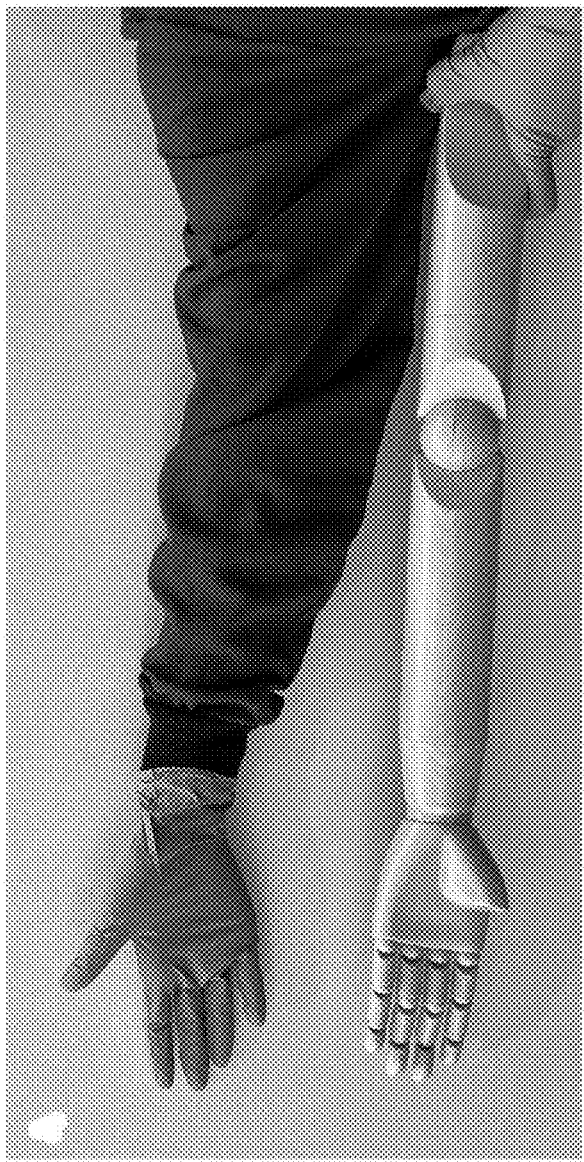
FIGS. 14A and 14B provide Scale reference for size of mannequin arm used in a demo of embodiments.
Figure 14B:
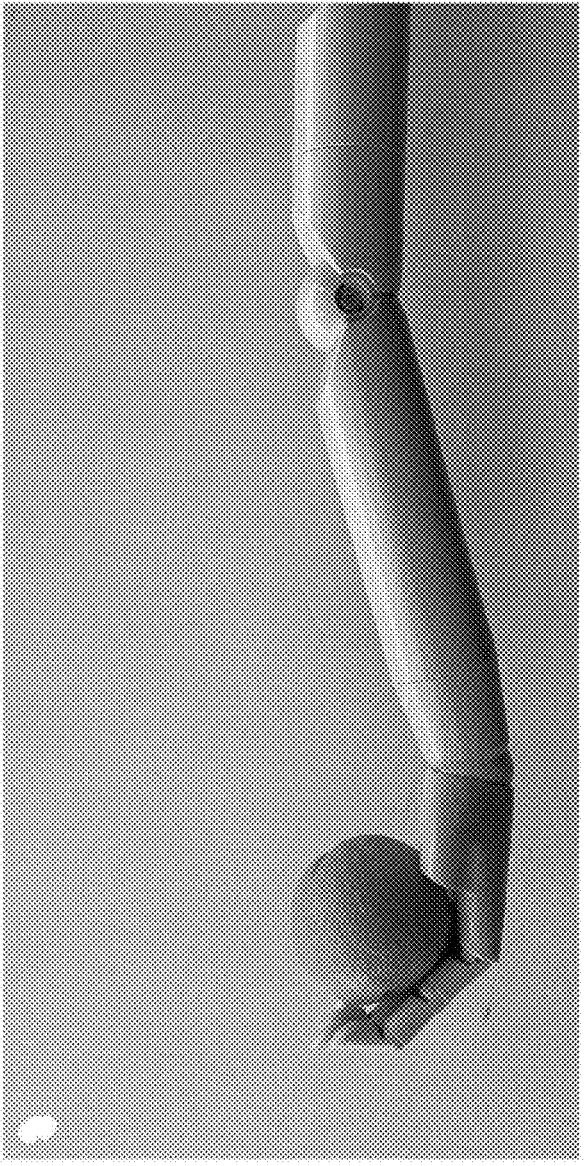

FIG. 4D shows a zoomed section of the fibril from the AFM image in FIG. 4C along with the corresponding height profile, highlighting the periodic nanofibers oriented perpendicular to the long axis of the fibrils. One can estimate the median diameter of the nanofibers to be ~8-9 nm (FIGS. 11A-11B), which is significantly greater than the expected distance between neighboring MPU hydrogen bonding units along the polymer chain when the PPG backbone chain is near full extension (~2 nm), suggesting that the nanofibers comprise at least 3-5 nanorods (i.e., rods of aligned MPU units), consistent with our previously reported results. A similar value for the fiber diameter (5.9 nm) can be obtained by fitting the SAXS data of strained PPG-MPU (FIGS. 12A-12B), which provides an excellent power-law fit with $I \propto q^{-2.60}$ up to an onset point of 0.107 Å$^{-1}$, corresponding to the fiber diameter. Attributed was the power-law scattering to surface fractal behavior created by interfaces of staggered nanofibers, similar to surface fractal behavior observed in polyethylene crystals and block copolymers. (See Ogawa, T.; Miyashita, S.; Miyaji, H.; Suehiro, S.; Hayashi, H. Fractal Properties of Polymer Crystals. *The Journal of Chemical Physics* 1989, 90 (3), 2063-2067. https://doi.org/10.1063/1.455997; Xie, R.; Yang, B.; Jiang, B. Surface Fractals in Block Copolymers. *Macromolecules* 1994, 27(8), 1997-2001. https://doi.org/10.1021/ma00086a003) The obtained fractal dimension (D=2.35) suggests that the interface is moderately rough compared to a perfectly flat surface (D=2) or a fully crumpled surface (D=3) and is close to the independently obtained surface fractal dimension from AFM (D=2.3) (FIGS. 12A-12B).

It is hypothesized that the alternating behavior between structured nanofibers and amorphous connecting regions arises from the localization of entanglement points between neighboring nanofibers, similar to recent MD simulations that have shown non-affine clustering of entanglements between homopolymer chains during elongation. (See Hsu, H.-P.; Kremer, K. Clustering of Entanglement Points in Highly Strained Polymer Melts. *Macromolecules* 2019, 52 (17), 6756-6772. https://doi.org/10.1021/acs.macromol.9b01120) It is posited that during strain, sections of the polymer chain between entanglement points are kinetically free to lengthen along the stretching axis, and chain sliding between neighboring chains aligns these lengthened sections into supramolecular nanofibers while simultaneously clustering the kinetically restricted entanglement junctions into the amorphous connecting regions between nanofibers. This hypothesis corresponds nicely with the observed nanofiber diameter, since the entanglement molecular weight ($M_e$) of PPG is ~2-3 kDa ($M_c$~2-3$M_e$), (see Fetters, L. J.; Lohse, D. J.; Colby, R. H. Chain Dimensions and Entanglement Spacings. In *Physical Properties of Polymers Handbook*, Mark, J. E., Ed.; Springer New York: New York, NY, 2007; pp 447-454 https://doi.org/10.1007/978-0-387-69002-5_25.) which corresponds to about 3-5 repeat units of PPG-MPU (0.65 kDa each) or a length of ~6-10 nm.

In summary, the structural characterization data presented above suggests a clear hierarchical structure as illustrated in FIG. 4A. Along the axis of strain, long fibrils (>10 µm in length, >100 nm in diameter) emerge comprising banded nanofibers (~8 nm in diameter) that are separated by amorphous connecting domains. Each of these nanofibers consists of aligned rods of hydrogen-bonded urea groups (4.5 Å) connected by stretched PPG backbone chains (~2 nm). The resulting hierarchical structure spans over five orders of magnitude, from stacked urea groups 4.5 Å apart to ordered fibrils over 10 µm in length, and results in uniform films at the macroscale (>1 cm).

Artificial Muscle Actuation

Figures 5A, 5B:
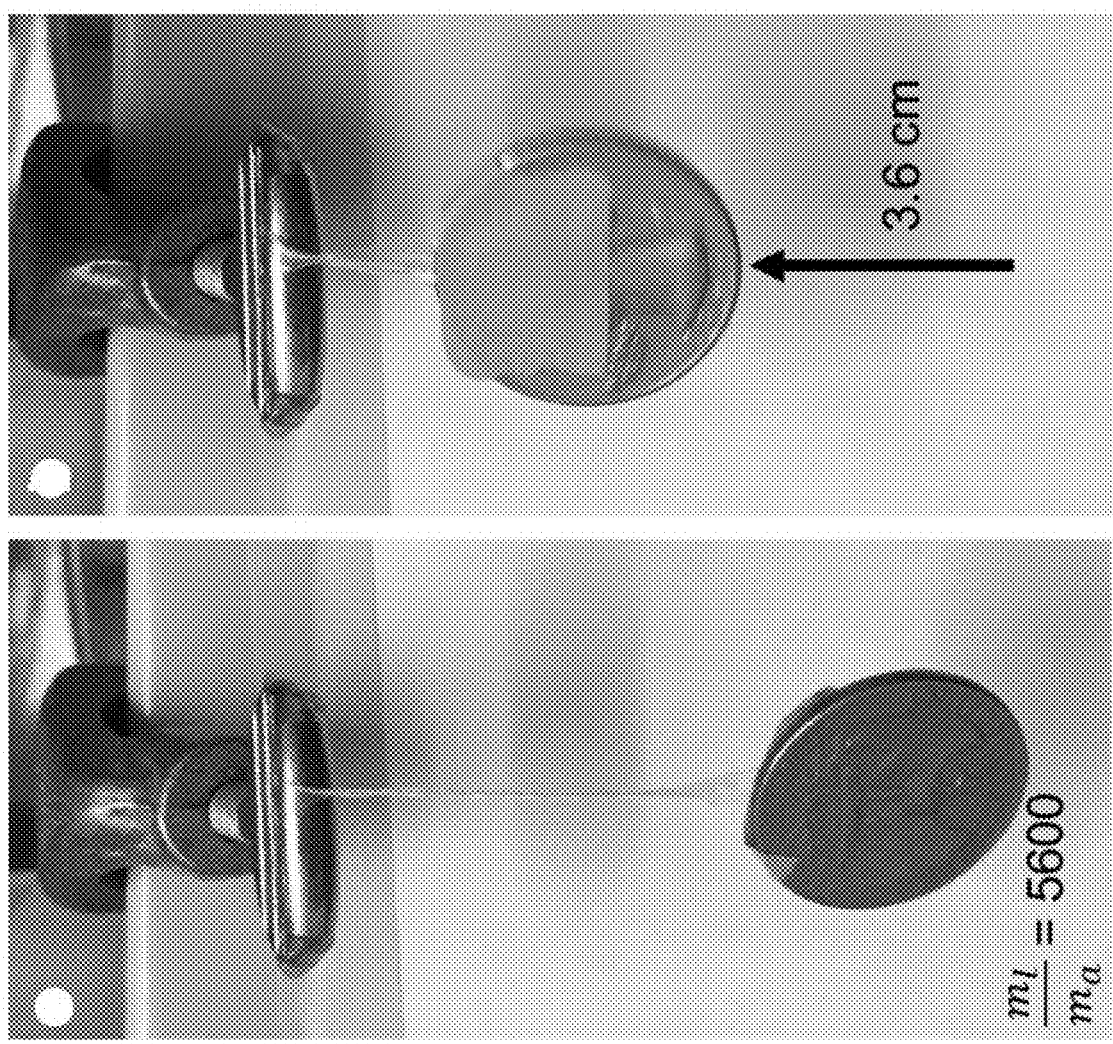
Figure 5F:
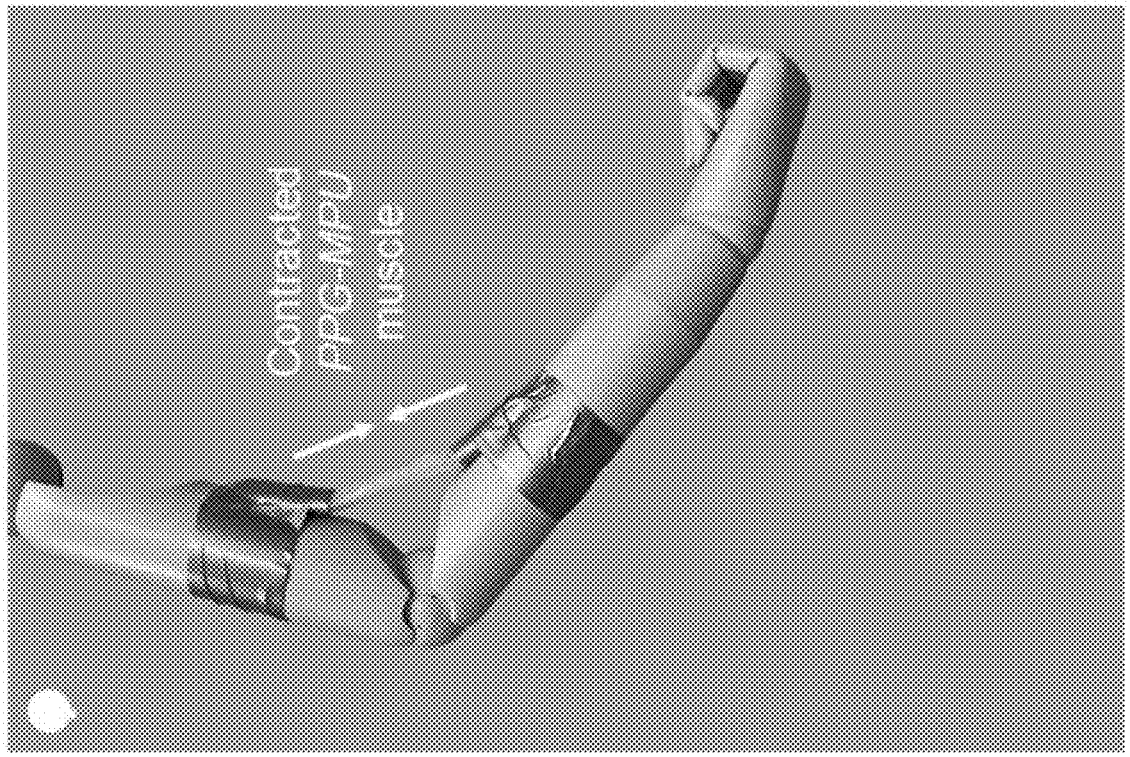
Figure 5E:
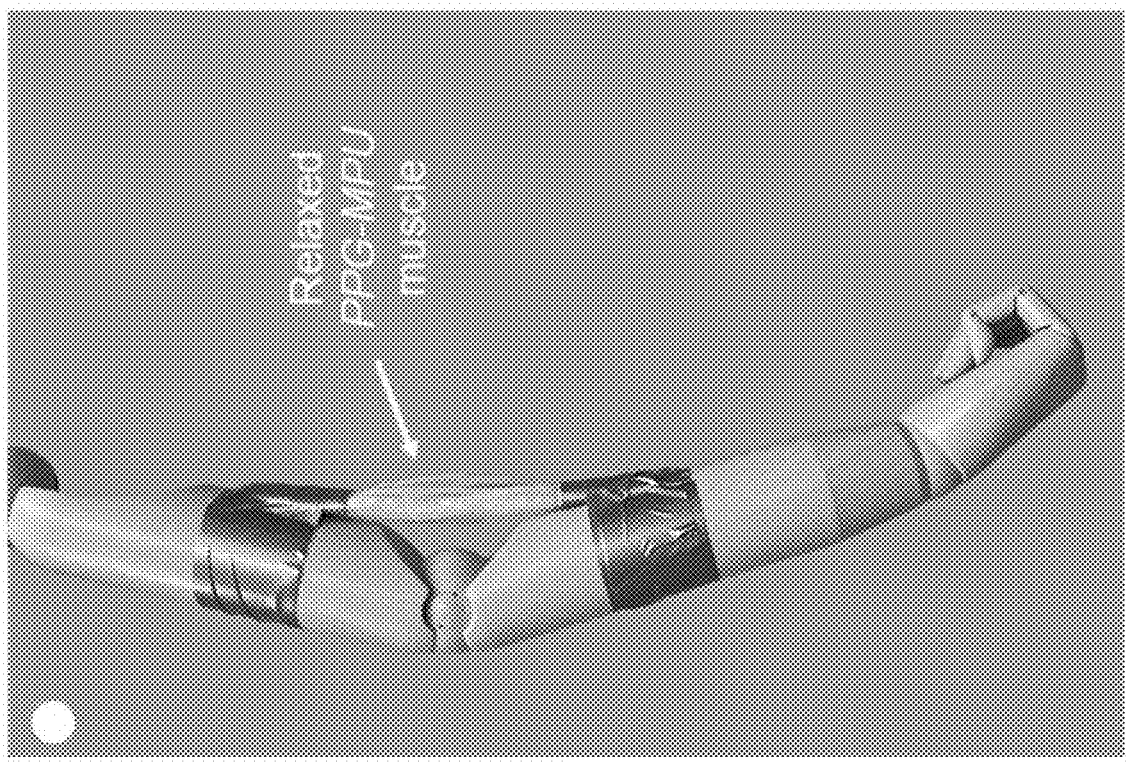
Figure 5G:
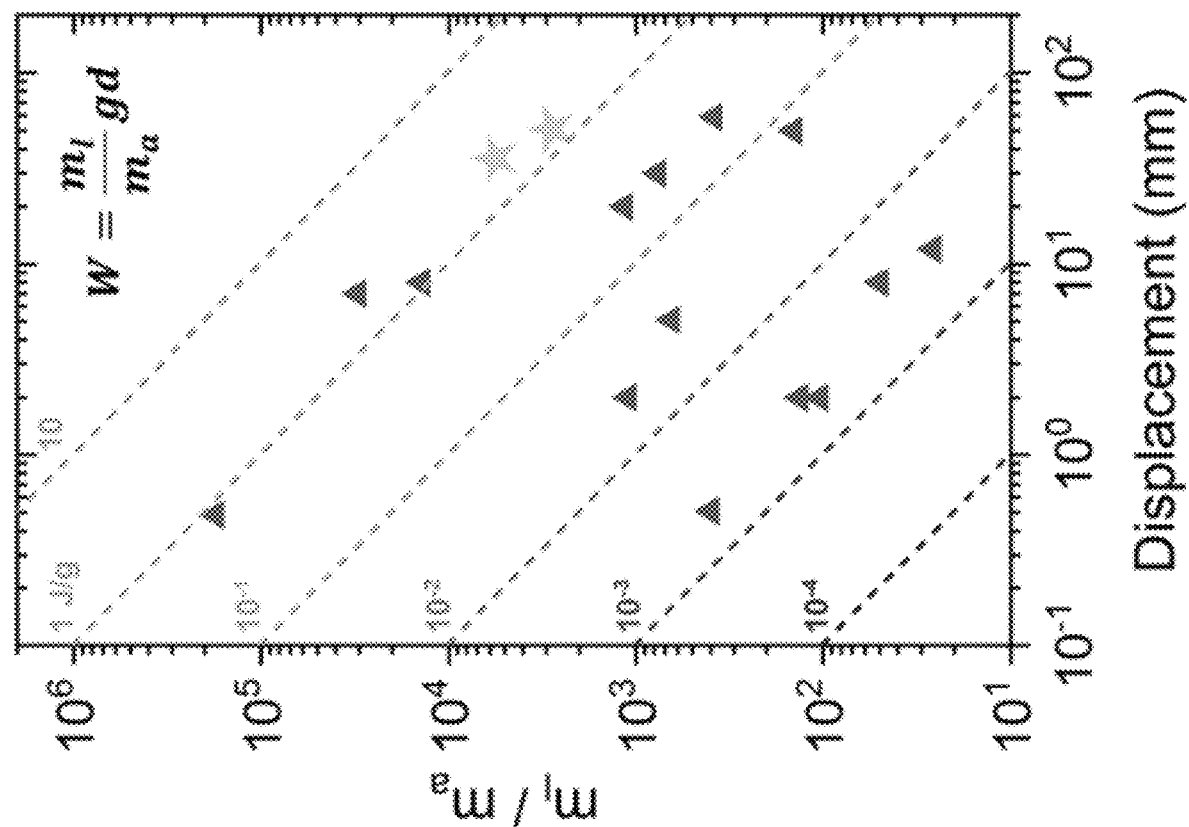

Finally, showed was the potential of PPG-MPU to be used as a strong and fast soft one-way actuator in a variety of demonstrations recorded in movies by the present Applicant. These movies show a pre-strained and twisted PPG-MPU thin film (1 mg) lifting and spinning a quarter (5.6 g) by 3.6 cm in less than a second upon heating with a heat gun (FIGS. 5A and 5B). The polymer lifts over 5000 times its own weight with a work output of 2 J/g or a power output of 2 W/g. Another movie presents another pre-strained PPG-MPU film (25 mg) raising a 70 g weight by 5.1 cm, corresponding to a work output of 1.4 J/g (FIGS. 5C and 5D), and another movie shows a pre-strained PPG-MPU film undergoing rapid, load-free shape recovery after being placed on a hot plate. Compared was this performance to other polymer actuators in FIG. 5G (Table S2), which plots the ratio of load mass to actuator mass on the y-axis and the distance lifted on the x-axis. The specific work output (W, J/g) can then be calculated directly:

$$W = \frac{m_l}{m_a} g d \quad (5)$$

where $m_l$ is the load mass, $m_a$ is the actuator mass, d is the displacement, and g is the acceleration of gravity. FIG. 5G highlights the differences between materials that possess similar work output but achieve it through different combinations of heavy loads versus large displacements. Compared to other actuators, PPG-MPU simultaneously achieves both a large actuation distance and high work output. It is important to note that as a one-way shape memory polymer PPG-MPU must be re-programmed after each cycle, limiting its potential applications compared to reversible actuators, which do not need to be re-programmed during cycling. Previous work has shown, through careful material processing and programming, that two-way shape memory can be achieved, (see Chung, T.; Romo-Uribe, A.; Mather, P. T. Two-Way Reversible Shape Memory in a Semicrystalline Network. *Macromolecules* 2008, 41 (1), 184-192. https://doi.org/10.1021/ma071517z; Li, J.; Rodgers, W. R.; Xie, T. Semi-Crystalline Two-Way Shape Memory Elastomer. *Polymer* 2011, 52 (23), 5320-5325 https://doi.org/10.1016/j.polymer.2011.09.030) which could enable PPG-MPU to be reversible without reprogramming; however, this is outside the scope of the current work.

Lastly, to demonstrate both the high energy density of PPG-MPU as well as its inexpensive and scalable synthesis, we actuate a full-size human mannequin arm (0.75 m in length, FIGS. 5E and 5F, FIGS. 14A and 14B) using an artificial muscle comprising pre-strained PPG-MP films. When heated, the fibers in the relaxed PPG-MPU muscle (3.8 g) contract to lift and hold the full-size arm (0.6 kg). These demonstrations highlight the combination of high energy density and ideal shape recovery achieved in the PPG-MPU polymer through the formation of strain-induced supramolecular nanostructures. The combination of these properties presents exciting future opportunities including integration with 3D or 4D printing, more complex patterning or programming, and locally controlled actuation.

CONCLUSION

This work presents the first report of a shape memory polymer based on supramolecular nanostructures that achieves record-high energy density of 19.6 MJ/m$^3$ with shape fixity and recovery above 90%. This performance is achieved through the novel mechanism of strain-induced supramolecular nanostructures, which fix flexible polymer chains in a highly elongated state, increasing the amount of stored entropic energy. Furthermore, the polymer reported here, which is synthesized using a simple one-pot synthesis, is low cost (<$5/kg for raw materials), single-component, solution soluble, and has a low density. These properties, combined with the excellent shape memory properties and high energy density of PPG-MPU, demonstrate the appeal of using strain-induced supramolecular structures to achieve high energy density one-way shape memory polymers.

Methods

Materials

Difunctional (primary amine) poly(propylene glycol) ($H_2N$-PPG-$NH_2$) with a molecular weight of 400 g/mol was obtained from Huntsman (Jeffamine D-400). All other chemicals and solvents were purchased from Sigma-Aldrich. All reagents were used as received without further purification. No unexpected or unusually high safety hazards were encountered.

Synthesis and Film Preparation

Figure 15:
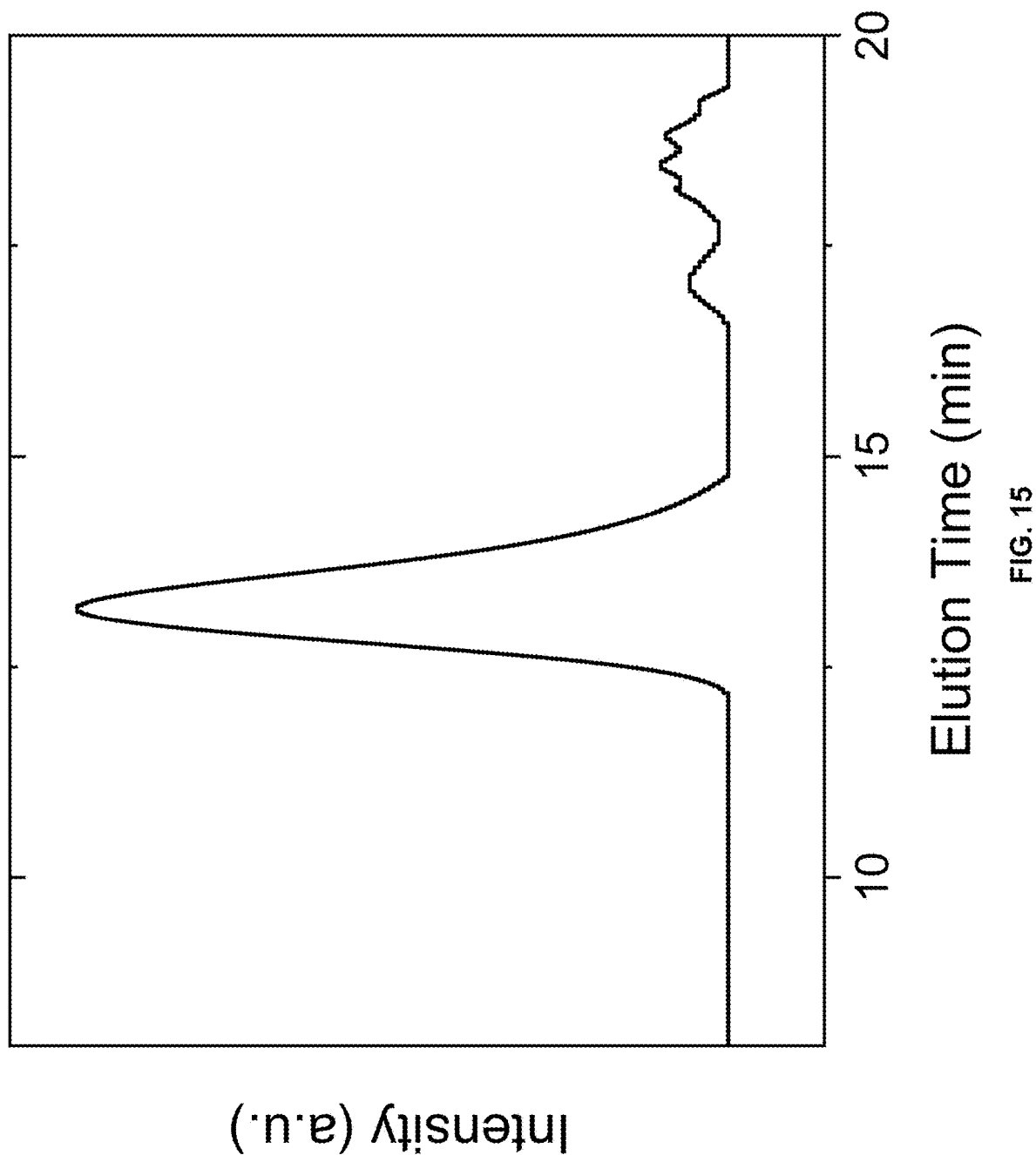
FIG. 15 is a graph providing example. GPC Data for PPG-MPU according to embodiments.
Figure 16:
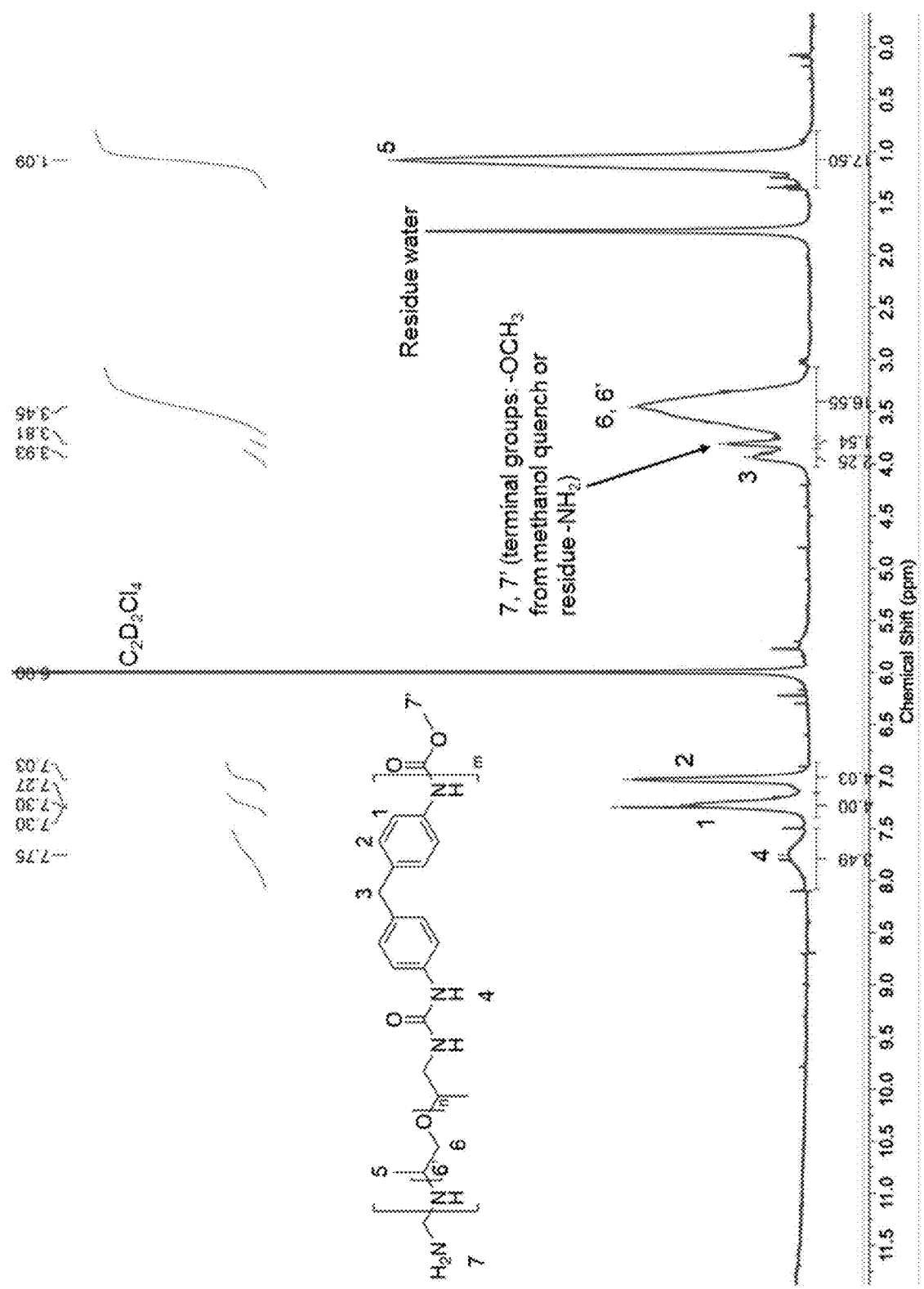
FIG. 16 is a graph illustrating 1H NMR labeled spectra according to embodiments.

This synthesis is a modification of a previously described synthesis for PDMS-based, amine-terminated macromonomers. A solution of $H_2N$-PPG-$NH_2$($M_n$~400 g/mol, Jeffamine D400) and anhydrous dichloromethane (8.0 g in 150 mL, 0.13 mM) was prepared under $N_2$ atmosphere. Methylenebis (phenyl isocyanate) (MPU) was added in a 1:1 molar ratio of amine:isocyanate functional groups (5.0 g, 0.13 mM). The resulting mixture was stirred for 72 hours at room temperature, until the solution gelled and partially precipitated. The synthesized polymer was quenched in methanol and then fully precipitated by adding an excess of hexane. The recovered polymer was subjected to vacuum evaporation for 2 hours at 90° C. Molecular weight according to GPC: $M_w$=12.0 kDa, $M_n$=10.6 kDa, $Đ_M$=1.1 (FIG. 15). $^1$H NMR (400 MHz, d2-$C_2D_2Cl_4$, δ/ppm): 7.75 (br, 4H), 7.30 (br, 4H), 7.03 (br, 4H), 3.93 (br, 2H), 3.81 (br, 1.5H), 3.45 (br, 17H), 1.09 (br, 17-18H) (assignments given in FIG. 16). Elemental analysis data: Analytical calculations for ($C_{39}H_{62}N_4O_8$)$_n$: C, 65.5; H, 8.7; N, 7.8; 0, 17.9. Found: C, 64.3; H, 8.5; N, 8.3; O, 18.9 (remaining).

Film samples were prepared by drop casting 100 mg/mL solutions in CHCl$_3$ onto SiO$_2$ wafers treated with a monolayer of octadecyltrichlorosilane (OTS) to allow for easy removal of the film and dried for over 12 hours at room temperature and then again at 70° C. for at least 24 hours. Higher quality films were obtained using lower concentrations (e.g. 50 mg/mL compared to 100 mg/mL), though the resulting drop-casted films were much thinner for lower concentrations, due to the decreased solution viscosity.

Mechanical Characterization (Instron)

Room temperature tensile tests were conducted on an Instron 5565 Instrument at a constant strain rate of 200% per minute. Rectangular samples with approximate dimension of 10 mm×4 mm×0.05 mm were cut from the substrate and loaded onto the extensometer with pressurized grips.

Dynamic Mechanical Analysis

Dynamic mechanical analysis (DMA) was performed on a DMA Q800 instrument. Shape memory experiments were pre-programmed into the DMA, with the polymer initially deformed to 300% strain at 50% strain per minute, held at fixed strain for 30 minutes, released to 0.001N, and then heated at 5° C. per minute to 70° C. Recovery stress experiments were performed by first straining the polymer film to 300% strain at 50% strain per minute and then holding for 30 minutes. The samples were released to 0.001N and then held under constant strain while the temperature was ramped at 5° C. per minute.

Small-Angle x-Ray Scattering Methods

Small-angle x-ray scattering (SAXS) was conducted in transmission mode on bulk polymer films at beamline 4-2 at Stanford Synchrotron Radiation Lightsource (SSRL) of SLAC National Accelerator Laboratory (SLAC, Menlo Park, CA). Bulk polymer films were tested as free-standing films with a thickness of 0.03 mm on a custom-built uniaxial stretcher. The x-ray wavelength was 0.827 Å (beam energy 15 keV) with a sample-to-detector distance of 3.512 meters. The Pilatus 1M fast detector was used for 2D scattering data acquisition and reduction into scattering intensity profiles as a function of the scattering vector q was done using customized code at the beamline. Otherwise, IgorPro (Wavemetrics Inc.) was used for plotting and processing the 1D and 2D data. For each sample, 30 frames of 1 second exposure were averaged to improve the signal-to-noise ratio. Measurements were performed in ambient air.

Wide-Angle x-Ray Scattering Methods

Wide-angle x-ray scattering (WAXS) was conducted in transmission mode on bulk polymer films at beamline 11-3 at Stanford Synchrotron Radiation Lightsource (SSRL) of SLAC National Accelerator Laboratory (SLAC, Menlo Park, CA). Bulk polymer films were tested as free-standing films. The x-ray wavelength was 0.974 Å (beam energy 12.735 keV) with a sample-to-detector distance of 250 mm. 2D scattering data were exported with the NIKA package[60] and calibrated in Wxdiff software using images from a LaB$_6$ standard. Integrations 90-120° (out-of-plane), and 0-30° (in-plane) were taken for each sample from 5 separate exposures in the same position and averaged together to reduce background noise. Background subtraction was performed by fitting a linear baseline. Measurements were performed in ambient air.

Fourier-Transform Infrared Spectroscopy

Infrared spectra were collected on a Nicolet iS50 FT-IR Spectrometer in transmission mode at room temperature. Polarization-dependent spectra were collected by varying the angle of the built-in polarizer.

Polarized Optical Microscopy

Films were imaged using a Leica DM4000 M LED optical microscope equipped with a cross-polarizer. Samples were rotated 450 under the cross-polarized light to view birefringence.

Size Exclusion Chromatography

Size exclusion chromatography (SEC) analysis was performed using a Tosoh EcoSEC Ambient (Room Temp)-GPC equipped with two TSK gel GPC columns (G3000Hhr and G4000Hhr; 7.8 mm I.D.×30 cm, 5 µm) calibrated with a conventional calibration curve using monodisperse polystyrene standards. THF (40° C.) was used as a carrier solvent at the flow rate of 1.0 mL/min. Samples were prepared at 1 mg/mL in 50% CHCl$_3$ and 50% THF by volume, by first dissolving in CHCl$_3$ and then THF.

Atomic Force Microscopy

Height and phase images were collected via atomic force microscopy (AFM) on a Nanoscope IIII Multimode AFM in tapping mode with Tap300AI-G probes (radius <10 nm). All images, statistical distribution extraction, surface fractal analysis, and 2D-FFT calculations related to AFM data were processed using Gwyddion software.

Differential Scanning Calorimetry

Differential scanning calorimetry (DSC) thermal analysis was performed on a TA instruments Q2000 DSC. Approximately 10 mg of polymer were placed in sealed aluminum pans and then heated to 120° C. for five minutes and cooled to −50° C. for five minutes. Samples were then ramped from −50° C. to 120° C. at a rate of 20° C./min. Glass transition temperatures were extracted using TA Universal Analysis software.

TABLE S1

Energy density comparison for various shape memory polymers.

| Type | Recovery Stress (MPa) | Recovery Strain (%) | Estimated Energy Density (MPa) | Strain Recovery (%) | Strain Fixity (%) | $R_f * R_r$ (%) | Ref |
|---|---|---|---|---|---|---|---|
| Strain-induced crystallization | 2 | 340 | 3.4 | 100 | 86 | 86 | 1 |
| | 4.7 | 80 | 1.9 | 88 | 79 | 70 | 2 |
| | 6.2 | 90 | 2.8 | 100 | 90 | 90 | 3 |
| | 11.6 | 26 | 3 | 100 | 33 | 33 | 4 |
| Glass or melting transition | 0.7 | 65 | 0.23 | 99 | 97 | 96 | 5 |
| | 1 | 400 | 2 | 100 | 80 | 80 | 6 |
| | 3 | 100 | 1.5 | 100 | 75 | 75 | 7 |
| | 3.6 | 150 | 2.7 | 100 | 97 | 97 | 8 |
| | 1 | 50 | 0.25 | 100 | 100 | 100 | 9 |
| Dynamic Bond | 0.1 | 10 | 0.005 | 95 | 95 | 90 | 10 |
| | 0.02 | 50 | 0.005 | 100 | 99 | 99 | 11 |
| | 0.06 | 20 | 0.006 | 90 | 100 | 90 | 12 |
| | 0.1 | 50 | 0.025 | 95 | 95 | 90 | 13 |
| | 0.15 | 50 | 0.0375 | 90 | 95 | 86 | 14 |
| | 1.9 | 200 | 1.9 | 98 | 100 | 98 | 15 |
| Liquid Crystal | 1.3 | 270 | 1.78 | 50 | 90 | 45 | 16 |
| | 0.5 | 200 | 0.5 | 100 | 100 | 100 | 17 |
| | 5 | 10 | 0.25 | 100 | 90 | 90 | 18 |

* Energy density (E) estimations were calculated as the area of a triangle with endpoints determined using the fully constrained recovery stress ($\sigma_{r,max}$) and the free shape recovery strain ($\varepsilon_{r,max}$).[19] That is:

$$E = \tfrac{1}{2} \sigma_{r,max} \varepsilon_{r,max}$$

TABLE S2

Demonstrated work output for various actuators.

| Type | $\dfrac{m_{load}}{m_{actuator}}$ | Displacement (mm) | Specific Work Output (J/g) | Ref |
|---|---|---|---|---|
| This work | 5600 | 36 | 2 | n/a |
| | 2800 | 51 | 1.4 | |

TABLE S2-continued

Demonstrated work output for various actuators.

| Type | $\frac{m_{load}}{m_{actuator}}$ | Displacement (mm) | Specific Work Output (J/g) | Ref |
|---|---|---|---|---|
| Liquid crystal elastomers | 1100 | 2 | 0.019 | 20 |
| | 400 | 0.51 | 0.002 | |
| | 133 | 2 | 0.0026 | 21 |
| Dielectric elastomers | 50 | 8 | 0.02 | 22 |
| Fiber-based | 650 | 5.1 | 0.04 | 23 |
| | 175000 | 0.49 | 0.836 | 24 |
| | 30600 | 7 | 2.1 | 25 |
| | 14000 | 8 | 1.1 | 26 |
| Ion-based | 104 | 2 | 0.002 | 27 |
| Pneumatic/ Fluid- driven | 1154 | 20 | 0.226 | 28 |
| | 769 | 30 | 0.226 | |
| | 385 | 59 | 0.222 | |
| | 26 | 12 | 0.003 | 29 |
| Hydrogel | 143 | 50 | 0.07 | 30 |

* Specific work output ($W$) can be related to mass ratio $\left(\frac{m_{load}}{m_{actuator}}\right)$ and displacement ($d$) as follows:

$$W = \frac{m_l}{m_a} * g * d$$

where $g$ is the acceleration of gravity (9.8 m/s$^2$).

Supporting Information

The approximate cost of the PPG oligomer (0.4 kDa, amine-terminated, Jeffamine D400) is $1,000 per 200 kg ($5/kg). The approximate cost of pure MDI per ton (907 kg) is $1500-$3000 (<$3.5/kg), according to ceicdata.com. Noting that polymerization requires a 1:1 molar ratio of the two components, leads to an estimated raw materials cost of $4.35/kg.

Data: DSC thermal analysis of PPG-MPU. Additional mechanical tests for PPG-MPU. Cycling data for PPG-MPU. Orientation of urea-urea H-bond stacking. AFM images of PPG-MPU under various strains. AFM estimate of fiber diameter. Surface fractal analysis and SAXS fiber diameter estimate. Additional AFM images. Scale reference for size of mannequin arm used in demo. GPC Data for PPG-MPU. $^1$H NMR labeled spectra.

Example Advantages and improvements over existing methods, devices or materials: Increase in the achievable actuation force for a stretchable, polymer actuator. Competing technologies include other shape memory polymers, liquid crystal elastomers, and supercoiled fiber actuators.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A polymer comprising:
   a periodic placement of directional dynamic bonding units along a flexible polymer backbone, wherein the periodic placement of directional dynamic bonding units is configured to enable the formation of strain-induced supramolecular structures during strain, and
   wherein the strain-induced supramolecular structures comprise uniform, periodic nanofibers oriented perpendicular to the strain.

2. The polymer of claim 1 comprising:
   a diamine-terminated poly(propylene glycol) (PPG) macromonomer;
   methylene (bis phenyl diisocyanate); and
   methylene bisphenylurea (MPU) units incorporated into the flexible polymer backbone.

3. The polymer of claim 2, wherein the strain-induced supramolecular nanostructures fix flexible polymer chains of the flexible polymer backbone in a highly elongated state.

4. The polymer of claim 1, wherein the strain-induced supramolecular structures form due to alignment of stretched backbone chains, and lock the stretched backbone chains in their elongated state due to the formation of the directional dynamic bonds.

5. The polymer of claim 4, wherein application of an appropriate stimulus weakens the directional dynamic bonds and enables the stretched backbone chains to retract, performing measurable work.

6. The polymer of claim 1, wherein the strain-induced supramolecular structures comprise long fibrils oriented parallel to strain that arises between neighboring regions of banded nanofibers.

7. The polymer of claim 1, wherein the polymer has an average chain length of less than 50 nm when fully extended.

8. The polymer of claim 6, wherein the long fibrils extend over 10 μm in length or 200 chain contour lengths.

9. The polymer of claim 1, wherein the periodic placement of directional dynamic bonding units is further configured to enable a high energy density, one-way shape memory polymer based on the formation of strain-induced supramolecular nanostructures.

10. The polymer of claim 4, wherein upon heating, the dynamic bonds break and stretched backbone chains contract to their initial disordered state.

11. The polymer of claim 1, wherein the periodic placement of directional dynamic bonding units is configured to store large amounts of entropic energy.

12. The polymer of claim 11, having a stored entropic energy is about 19.6 $MJ/m^3$ or 17.9 J/g.

13. The polymer of claim 1, wherein a median diameter of the nanofibers is about 8 to 9 nm.

14. The polymer of claim 1, wherein the nanofibers comprise aligned rods of hydrogen-bonded urea groups (4.5 Å) connected by stretched PPG backbone chains (~2 nm).

15. The polymer of claim 14, wherein the aligned rods are about 4.5 Å.

16. The polymer of claim 14, wherein the stretched PPG backbone chains are about 2 nm.

17. A method of producing a polymer, the method comprising:
    preparing a solution of $H_2N$-PPG-$NH_2$ and anhydrous dichloromethane; and
    adding methylenebis(phenyl isocyanate) (MPU) in a 1:1 molar ratio of amine: isocyanate functional groups, to obtain the polymer,
    wherein:
       the polymer comprises a periodic placement of directional dynamic bonding units along a flexible polymer backbone, wherein the periodic placement of directional dynamic bonding units is configured to enable the formation of strain-induced supramolecular structures during strain, and
       wherein the strain-induced supramolecular structures comprise uniform, periodic nanofibers oriented perpendicular to the strain.

18. The method of claim 17, wherein the solution is prepared under $N_2$ atmosphere.

* * * * *